US010328782B2

(12) United States Patent
Sajedi

(10) Patent No.: US 10,328,782 B2
(45) Date of Patent: Jun. 25, 2019

(54) AUTOMATIC VEHICLE COVER

(71) Applicant: Majid Sajedi, Shiraz (IR)

(72) Inventor: Majid Sajedi, Shiraz (IR)

( * ) Notice: Subject to any disclaimer, the term of this patent is extended or adjusted under 35 U.S.C. 154(b) by 108 days.

(21) Appl. No.: 15/441,273

(22) Filed: Feb. 24, 2017

(65) Prior Publication Data
US 2017/0166041 A1    Jun. 15, 2017

Related U.S. Application Data

(60) Provisional application No. 62/299,561, filed on Feb. 25, 2016.

(51) Int. Cl.
*B60J 11/04*      (2006.01)

(52) U.S. Cl.
CPC ......... *B60J 11/04* (2013.01); *B60Y 2400/405* (2013.01); *B60Y 2400/4045* (2013.01); *B60Y 2400/41* (2013.01); *B60Y 2410/10* (2013.01)

(58) Field of Classification Search
CPC ... B60J 11/00; B60J 11/04; B60J 11/06; B60J 11/08; B60J 11/02; B60J 7/1204; B60J 7/1252; B60J 7/1265
USPC ........ 296/136.13, 136.12, 95.1, 107, 1, 108, 296/98, 100.04; 150/166, 167, 168
See application file for complete search history.

(56) References Cited

U.S. PATENT DOCUMENTS

| 5,855,406 A | 1/1999 | Vargo |
| 6,206,451 B1 | 3/2001 | Maano |
| 7,464,982 B1 | 12/2008 | Lin |
| 8,070,211 B2* | 12/2011 | Suh ............ B60J 11/00 150/166 |
| 8,167,356 B1 | 5/2012 | Morazan |
| 8,366,172 B1* | 2/2013 | Morazan ........... B60J 11/00 296/97.1 |
| 8,419,107 B2* | 4/2013 | Manchanda ....... B60J 11/06 296/136.1 |
| 2006/0162873 A1* | 7/2006 | Dao ................ B60J 11/00 160/122 |

(Continued)

FOREIGN PATENT DOCUMENTS

| CN | 103991371 A | 8/2014 |
| WO | 2010073071 A1 | 7/2010 |

OTHER PUBLICATIONS

R. K. Tyagi, An Innovative Approach for Automatic Car Cover, International Journal of Innovative Research in Science, Engineering and Technology, Sep. 2013, vol. 2, Issue 9, pp. 4825-4829.

*Primary Examiner* — D Glenn Dayoan
*Assistant Examiner* — Sunsurraye Westbrook
(74) *Attorney, Agent, or Firm* — Bajwa IP Law Firm; Haris Zaheer Bajwa

(57) ABSTRACT

A vehicle covering system that may include a cover having a first fold and a last fold, a first arm and a second arm, an arm (opening/closing) mechanism to open and close the first arm and the second arm, a folding mechanism to fold and unfold the cover; and a control system to cause the opening/closing mechanism to open the first arm and the second arm from a closed position to an opened position and cause the arm mechanism to close the first arm and the second arm from an opened position to a closed position, and cause the folding mechanism to fold and unfold the cover when the first and the second arms are in an opened position.

19 Claims, 28 Drawing Sheets

(56) References Cited

U.S. PATENT DOCUMENTS

2009/0183809 A1* 7/2009 Wiegel .................... B60J 11/00
150/166

* cited by examiner

US 10,328,782 B2

AUTOMATIC VEHICLE COVER

CROSS REFERENCE TO RELATED APPLICATION

This application claims the benefit of priority from U.S. Provisional Patent Application No. 62/299,561, filed on Feb. 25, 2016, and entitled "FULLY AUTOMATED AND SMART FOLDING CAR COVER," which is incorporated herein by reference in its entirety.

TECHNICAL FIELD

The present disclosure generally relates to systems and methods for covering of vehicles, particularly to systems and methods for automatic vehicle covering.

BACKGROUND

The protection of vehicles from paint degradation, corrosion, interior materials aging and color degradation may be considered as one of the main concerns of vehicle owners, which may force them to think about utilizing car covers to protect their vehicles from sunlight, rays, rain, snow, dust, etc. To this end, various types of covers have been introduced for various classes of vehicles including classic vehicles, mid-sized sedans, sport utility vehicles (SUVs), and compacts.

However, there is a need in the art for methods and devices for fully automatic vehicle covering without the need for manual intervention. There is further a need in the art for a smart method and device that allows for automatically covering a vehicle depending on the environmental conditions.

SUMMARY

Disclosed aspects include example systems and methods for automatic vehicle covering and examples may include a fully automatic and smart vehicle cover configured to provide protection for outer surface of a vehicle.

In an general aspect, the present disclosure describes a vehicle covering system, that may include: a cover that may have a first fold and a last fold; a first arm and a second arm, where a first portion of the first fold may be attached to an upper surface of the first arm and a second portion of the first fold may be attached to an upper surface of the second arm; an arm (opening/closing) mechanism that may be configured to open and close the first arm and the second arm; a folding mechanism that may be configured to fold and unfold the cover; and a control system that may be configured to cause the opening/closing mechanism to open the first arm and the second arm from a closed position to an opened position and cause the opening/closing mechanism to close the first arm and the second arm from an opened position to a closed position, and cause the folding mechanism to fold and unfold the cover when the first and the second arms are in an opened position.

According to an implementation, the covering system may further include an enclosure to enclose the cover, the first and the second arms, and the opening/closing mechanism therein. The enclosure may be a space defined inside the rear section of the vehicle and the rear section may include a part of the trunk and the hollow space inside the rear bumper. The rear bumper may include a movable wall that may be configured to be displaced from a first position to a second position. The first position may be on the rear bumper and the second position may be under the vehicle.

According to an implementation, the covering system may further include a first displacing mechanism to move the movable wall of the rear bumper from the first position to the second position. The displacing mechanism may include a motor having an output shaft, a converting mechanism coupled with the output shaft and an intermediate link attached to the movable wall of the rear bumper from one side and engaged with the converting mechanism from the other side. The converting mechanism may be configured to convert the rotational movement of the output shaft to a linear movement of the intermediate link.

According to an implementation, the covering system may further include a second displacing mechanism to displace the cover in a folded state, the arms and the opening/closing mechanism. The second displacing mechanism may be disposed within the enclosure and may include a movable mounting plate to allow for mounting the opening/closing mechanism thereon; and an actuating mechanism that may be coupled with the movable mounting plate and may be configured to displace the movable mounting plate in and out of the enclosure. The actuating mechanism may include a motor having an output shaft and a converting mechanism that may be coupled with the output shaft and may convert the rotational movement of the output shaft to a linear movement of the movable mounting plate.

According to an implementation, the opening/closing mechanism may include a first actuating mechanism and a second actuating mechanism. The first actuating mechanism may be pivotally coupled to a proximal end of the first arm to actuate the first arm to pivot about a first pivot point from a closed position to an opened position in an opening process and to pivot about the first pivot point from the opened position to the closed position in a closing process. The second actuating mechanism may be pivotally coupled to a proximal end of the second arm to actuate the second arm to pivot about a second pivot point from a closed position to an opened position in an opening process and to pivot about the second pivot point from the opened position to the closed position in a closing process.

In an implementation, the first actuating mechanism and the second actuating mechanism may include a hinge device having an upper leaf and a lower leaf and a central axis and a motor. The lower leaf may be fixed on the movable mounting plate and the upper leaf may be attached to a respective arm. The motor may be coupled with the central axis to rotate the respective arm.

According to an implementation, the hinge device may be replaced, for example, with a gearbox mechanism attached to the moveable mounting plate having an input shaft coupled with the motor and an output shaft pivotally attached to the proximal end of one of the arms.

In one implementation, the gearbox mechanism may include a housing, a bevel pinion-gear set, a first flat gear and a solenoid. The housing may include a fixed cylindrical container mounted on the movable mounting plate and fixed thereon to linearly displace therewith, and a rotatable cylindrical housing mounted coaxially on the fixed cylindrical container. The bevel pinion-gear set may rotate the respective arm and may include a driver bevel gear mounted on the input shaft and coupled with the motor and meshed with a driven bevel pinion to transmit the rotational power of the motor to the driven bevel pinion and freely displace along a shaft and a driven bevel pinion mounted on the output shaft and attached pivotally to the proximal end of the respective arm. The driven bevel pinion may be configured to transmit the rotational power to the respective arm. The first flat gear may be coaxially attached to the upper surface of the driver bevel gear and rotatable therewith. The solenoid may be attached to the upper section of the rotatable cylindrical container and may be configured to engage and disengage the first flat gear with a second flat gear. The second flat gear may be attached to the solenoid coaxial with the first flat gear.

According to another implementation, the folding mechanism may include a container, a strip-like member placed inside the container from one end and attached to the last fold of the cover from another end and an actuator that may be configured to roll the strip-like member in and out of the container.

The actuator of the folding mechanism may include: a motor that may be configured to drive the strip-like member in and out of the container; a roller wheel that may be coupled with the motor, transversely placed on the strip-like member and force the strip-like member to move in a direct path; and a plurality of the rollers that may be placed on the strip-like member to straighten the path of the strip-like member.

According to another implementation, the strip-like member of the folding mechanism may be symmetrically attached to the last fold of the cover and may pass through the passage made by the transversal cords on the lower surface of the cover and carry the cover to be unfolded or folded.

In another implementation, the cover may include an accordion-pleated cover and the accordion-pleated cover may include a cover fabric, a plurality of transversal cords and at least two longitudinal cords. The cover fabric may have a plurality of folds, an upper surface and a lower surface. The plurality of transversal cords may be attached to the lower surface of the cover fabric and provide a guiding passage for the strip-like member to pass on the lower surface of the cover fabric. The longitudinal cords may be symmetrically attached to the lower surface of the cover fabric at either sides of the strip-like member.

According to another implementation, two equal lengths of either sides of the first fold of the cover may be attached to the upper surfaces of the first arm and the second arm.

In another implementation, the control system may cause the second displacing mechanism to displace the opening/closing mechanism, the first and the second arms and the cover in and out of the enclosure when the first and the second arms are in the closed position.

In another general aspect, the present disclosure describes a method for opening and closing a covering system. The method for opening the covering system may include: determining modes of operation of the covering system including an automatically triggered mode and a manually triggered mode. The automatically triggered mode may include: sensing the required environmental conditions for the covering system by a sensor system; and determining a need for activation of the covering system by a controller. The automatically triggered mode as well as the manually triggered mode may further include: checking distance of a vehicle to barriers of a parking location; activation of a first displacing mechanism for displacing a movable wall of a rear bumper from an initial location on a rear bumper to a secondary location; activation of a second displacing mechanism for taking a folded cover and arms along with an opening/closing mechanism out of an enclosure to a second position; activation of the opening/closing mechanism for opening closed arms from a closed state of the second position to an opened state of a third position; activation of a folding mechanism for unfolding a cover from a folded state in the third position to an unfolded state in a fourth position.

According to an implementation, the method for opening and closing the covering system may further include different positions, wherein the different positions may include: a second position wherein a folded cover and arms may be placed parallel to the rear bumper and the ground; a third position, wherein the arms may be opened and placed parallel to sides of the vehicle and the ground; and a fourth position, wherein the cover may be unfolded.

According to another implementation, the method for opening and closing the covering system may further include a method for closing the covering system, wherein the method for closing the covering system may include: sending an uncovering command to the controller using a remote control; activation of the folding mechanism for folding the cover from an unfolded state of the fourth position to a folded state in the third position; activation of the opening/closing mechanism for closing the arms from the opened state in the third position to the closed state in the second position; activation of the second displacing mechanism for taking the folded cover and arms along with the opening/closing mechanism inside the enclosure from the second position; and activation of the first displacing mechanism for displacing the movable wall of the rear bumper to the initial location on the rear bumper.

DETAILED DESCRIPTION

Disclosed systems and methods herein are directed to a covering system, capable of covering outside surfaces of different kinds of vehicles, for example, different classes of vehicles like sedans, SUVs, vans, etc.

In an aspect, the present disclosure describes a covering system that may include a cover, a first arm and a second arm, an opening/closing mechanism (an arm mechanism), a folding mechanism and a control system.

Figure 1:
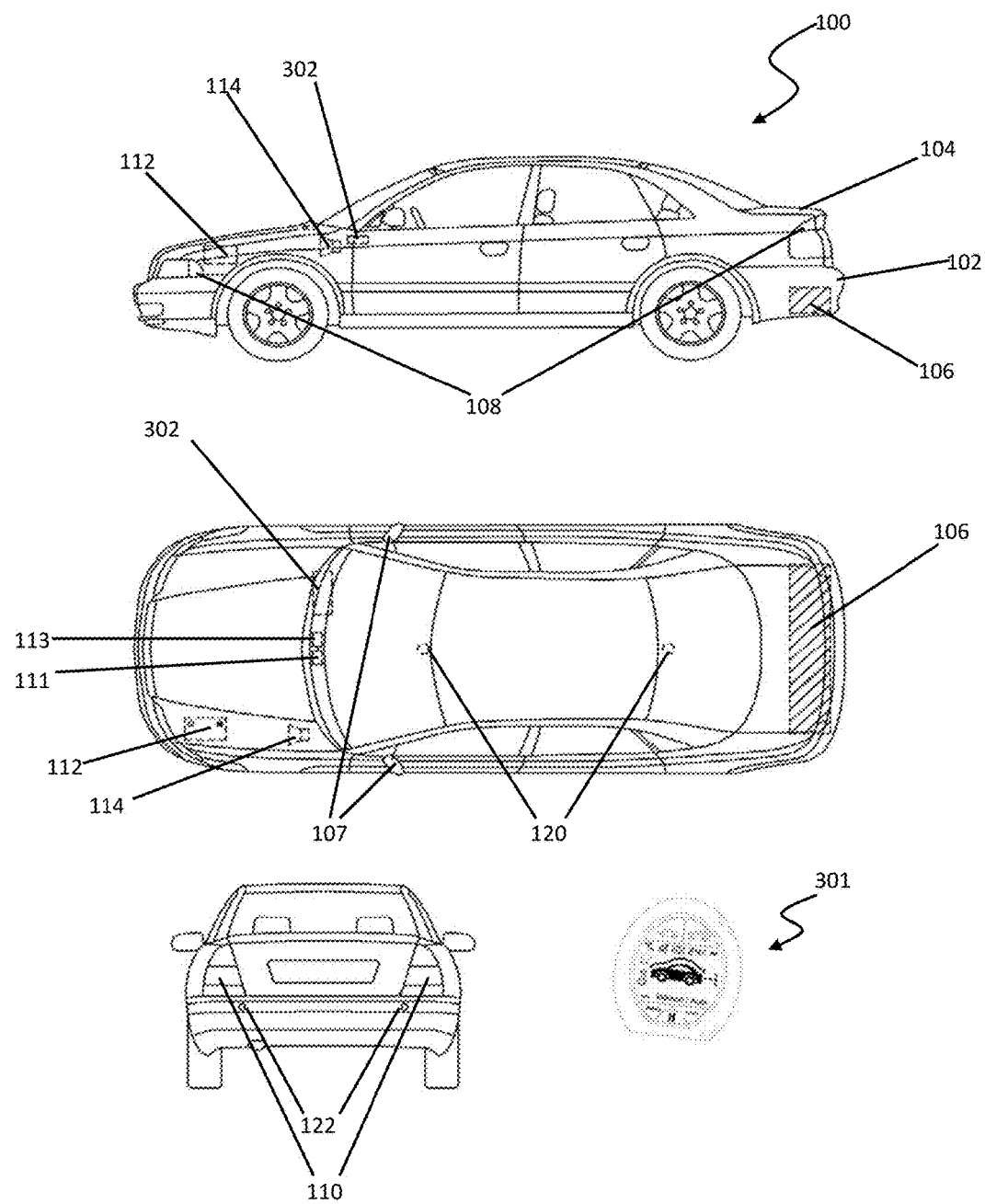
FIG. 1 illustrates different views of an exemplary vehicle showing different parts and accessories of the vehicle in association with a cover and its remote control, consistent with one or more exemplary embodiments of the present disclosure.

FIG. 1 shows different schematic views of an exemplary vehicle 100. The exemplary vehicle 100 may include a rear bumper 102, a trunk (or any back section) 104, vehicle flashers 108, a reverse gear light 110, a speaker 114, a battery 112, side mirrors 107, etc. The exemplary vehicle 100 may also include some other parts and accessories like a distance sensor 122 configured to measure the distance, a light sensor 120 configured to measure the intensity of sunlight, a temperature sensor 111, a humidity sensor 113, and a controller 302. There may be a specific space as an enclosure 106 bounding inside of the rear bumper 102 and a portion of the trunk 104, which is shown as a dashed-line area. The enclosure 106 may provide a space for placement of specific parts and mechanisms related to an exemplary covering system.

The covering system disclosed herein, may be activated either manually by a user or automatically by a control system. The cover may undergo an opening process or a closing process. In the opening process, the cover may be taken out of the enclosure where it unfolds to cover the outer surface of a vehicle. In a closing process, the cover may fold from an opened position to a folded position, thereby become placed inside the enclosure. The opening and closing processes may be controlled by the control system.

Figure 2:
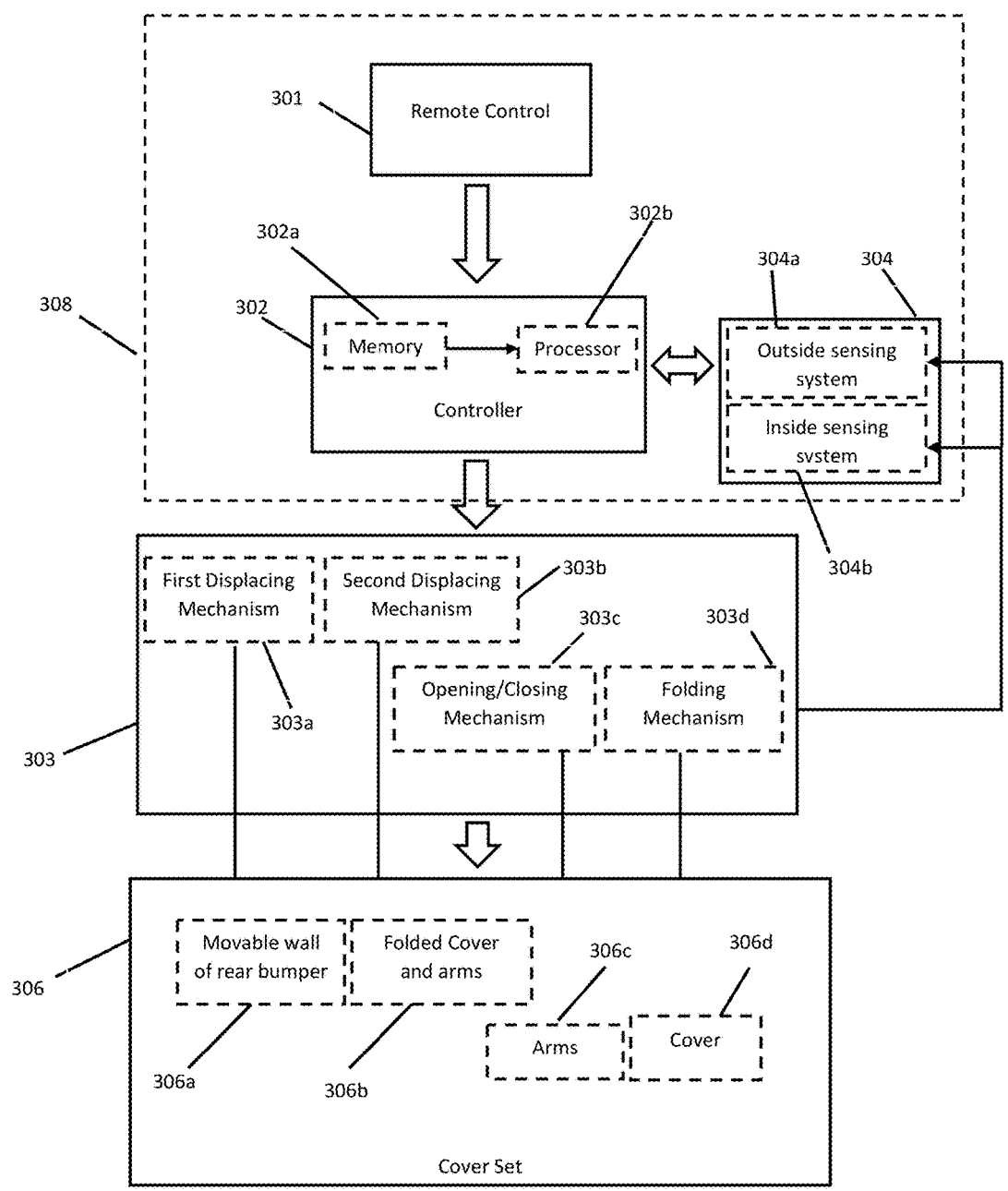
FIG. 2 illustrates a schematic block diagram of one implementation of an exemplary covering system, consistent with one or more exemplary embodiments of the present disclosure.

FIG. 2 is a schematic block diagram of one implementation of an exemplary covering system 300 according to one or more aspects of the present disclosure. The covering system 300 may include a cover set 306, an actuating system 303 and a control system 308. The control system 308 may include a remote control 301, a controller 302 and a sensor system 304. The cover set 306 may include the movable wall of the rear bumper 306a, the folded cover and arms 306b, the arms 306c and a cover 306d.

The actuating system 303 may generally cause the different elements of the cover set 306 to be operated. The actuating system 303 in one exemplary implementation may include: a first displacing mechanism 303a, a second displacing mechanism 303b, an opening/closing actuating mechanism 303c, and a folding mechanism 303d.

In one implementation, the cover may include an accordion-pleated cover. The cover may have the capability of folding or unfolding along accordion-like patterns. The cover may include a cover fabric, a plurality of transversal cords attached to the lower surface of the cover fabric and at least two longitudinal cords symmetrically attached to the lower surface of the cover fabric. The cover fabric may have a plurality of folds, an upper surface, and a lower surface.

In some implementations, the cover 306d in a folded state may be housed inside a specified space, for example, the enclosure 106 in FIG. 1. The cover 306d may be taken out of the enclosure 106 and unfolded in order to cover an outside surface of an exemplary vehicle.

In one exemplary implementation the enclosure 106 may be bounded to a portion of lower side of the trunk 104 and/or inside part of the rear bumper 102. The enclosure 106 may be also an external housing, which may be attached to the vehicle 100 (FIG. 1).

In a state in which the cover 306d is placed in the enclosure 106, a back wall 306a of the rear bumper may be configured to be movable. A first fold of the cover 306d may be attached to upper surfaces of two pivotally rotatable arms 306c. The cover may have an opened position when the cover is wrap the vehicle and a folded position when placed on the arms 306c.

The set of the remote control 301, the controller 302 and the sensor system 304 may collectively form the control system 308. The control system 308 may control any movements of the covering system 300 and control decisions regarding sequential actuations of mechanisms, sensing of the ongoing conditions regarding the inside actuations, or sending external conditions utilizing data exchanged between it and the actuating system 303 and the sensor system 304.

The remote control 301 may directly send data to the controller 302. A user may press a manual tab on the remote control 301, to manually trigger the covering system 300. Alternatively, the covering system 300 may be automatically triggered to open based on a determination and a command from the control system 308. In an exemplary embodiment, the automatic functionality may be triggered by pressing the auto tab of the remote control 301.

In the automatic mode, the outside sensing system 304a may determine if a set of required conditions are satisfied to force the covering system 300 to be activated or opened by the controller 302. The environmental conditions may include intensity of sunlight, temperature, humidity, in addition to other outside weather condition which may be sensed by sensors such as respective sunlight sensor 120, temperature sensor 111 and humidity sensor 113 to determine if there is any need for the covering system 300 to be activated. Also, the allowable distance of the vehicle 100 from side barriers may be sensed by a distance sensor 122 to be greater from a predefined distance to allow the covering system 300 to be activated. The controller 302 may trigger the covering system 300 upon receiving the signal from the distance sensor 122 indicating the allowable and needed distance exists.

The sensor system 304 may include an outside sensing system 304a (receiving input data from outside of the covering system 300) and an inside sensing system 304b including different sensors specified to each of the actuating mechanisms, separately. The outside sensing system 304a may include the light sensor 120, the humidity sensor 113 and the temperature sensor 111 along with the distance sensor 122. The outside sensing system 304A may be configured to provide the controller 302 with the data from the ongoing environmental conditions. The sent data to the controller 302 may be used as a base for the controller 302 to activate the covering system 300.

Also, the distance of the rear bumper 102 from the side barriers may be detected and sent to the controller 302 by a distance sensor of the outside sensing system 304a. The existence minimum distance may be checked to in order to take the folded cover and arms 306b out of the enclosure 106 without causing a collision. The controller 302 may use the feedback received from the outside sensing system 304b to decide whether the folded cover and arms 306b may be opened and taken out of a box. The inside sensing system 304b may include sensors which are associated with each of the actuating mechanisms in order to inspect and regulate the functionality of the actuating mechanisms.

The controller 302 may provide the required control signals for either actuation or sensing in a successive and timely manner. The controller 302 may include a memory 302a for storing the received data and a processor 302b for processing the received data and producing control signals. The input data which may be received from the sensor system 304 or the remote control 301 may be stored in the memory 302a and serve as an input for the processor 302b. The processor 302b may be configured to process the data received and produce the control signals for the subsequent actuating system 303. The processor 302b may send control signals to the mechanisms of the actuating system 303 and also the sensors of the sensor system 304 sequentially.

A number of different mechanisms may be configured to actuate respective parts of the covering system. The control system may determine the timing and sequence of the actuations.

In one exemplary implementation, the actuating system 303 may include the first displacing mechanism 303a, the second displacing mechanism 303b, the opening/closing mechanism 303c and the folding mechanism 303d. All mechanisms of the actuating system 303 may be activated to deliver a specific functionality under the control of the control system 308.

The first displacing mechanism 303a may be configured to displace the movable wall of the rear bumper 306a from a first position, for example, on the rear bumper 102 to a second position, for example, under the bottom of the vehicle 128 to allow for the displacement of the cover 306d in its folded state as described below.

The second displacing mechanism 303b may be configured to linearly displace the folded cover and arms 306b from a first position inside the enclosure 106 to a second position outside the enclosure 106. The second position may be, for example, a position parallel to the rear bumper 102 and the ground. The second displacing mechanism 303b may be also configured to displace the opening/closing mechanism 303c along with the folded cover and arms 306b in order to be able to perform opening and closing functionality.

The opening/closing mechanism 303c may be configured to enable the arms 306c in the closed state to pivotally rotate around a connecting line or point in one rotation or a set of three successive rotations and the folding mechanism 303d may be configured to fold or unfold the cover 306d.

During an opening process, the control system 308 may activate respective mechanism of the actuating system 303 to take the required operation under the regulatory inspection of the respective sensors of the inside sensing system 304b. In one step, the first displacing mechanism 303a for displacing the movable wall of the rear bumper 306a may be actuated. As a result, the movable wall 306a may be placed under the bottom of the vehicle 100. Then, the controller 302 may enforce the second displacing mechanism 303b to take the folded cover and arms 306b out of the enclosure 106. As a result the folded cover and arms 306b may be placed in the second position parallel to the rear bumper and the ground. Then, the opening/closing mechanism 303c may be actuated to pivotally open the arms 306c in a defined timely manner. In this step, the arms 306c may be placed parallel to either sides of the vehicle 100 and the ground after the movement. After the opening of the arms 306c, the cover 306d may be placed in a position which enables the cover 306d to take the unfolding process. In another step, the folding mechanism 303d may be actuated by the control system 308 to trigger the unfolding operation of the cover 306d. If the opening process is not be paused, for example, through pressing the respective tab on the remote control 301, the cover 306d may be unfolded fully to wrap whole the outer surface of the vehicle 100. The process for a closing operation may be performed in a reverse steps, which means that all mechanisms may be summoned in successive reverse steps, which is discussed later in this disclosure in further detail.

Figure 3A:
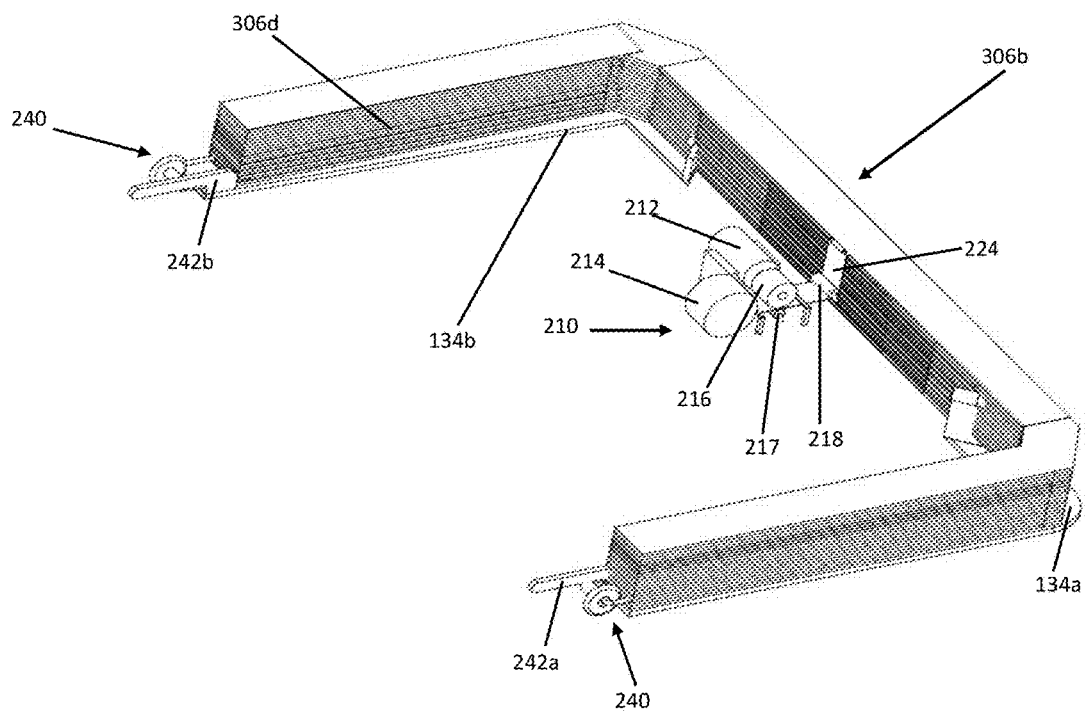
FIG. 3A illustrates an exemplary folded cover and arms set along with an exemplary folding mechanism attached to the cover, consistent with one or more exemplary embodiments of the present disclosure.

FIG. 3A shows an exemplary implementation of the folded cover and arms set 306b along with an exemplary folding mechanism 303d attached to the cover 306d. According to FIGS. 1 and 3A, the cover 306d is attached to the arms 134a and 134b. The cover 306d in its folded state along with the arms 134a and 134b in their closed state may form a set, which may be named the folded cover and arms 306b and located inside the enclosure 106. The enclosure 106 may be configured to hold the folded cover and arms 306b. The cover 306d in its folded state may be placed in the enclosure 106, when the vehicle 100 is running or at the onset of starting, or when the control system 308 determined that the covering system 300 should not be triggered. When the vehicle 100 is stopped in a parking location and there is no other movement in the position of the vehicle 100, the control system 308 may determine if there is any need for the covering system 300 to be triggered and provide means for performing either the opening process 400 (as shown in FIG. 18A) or closing process 500 (as shown in FIG. 18A) of the covering system 300.

In embodiments, covering system 300 may operate in an automatically triggered mode or in a manually triggered mode. In order for the cover 306d to be activated into the covering operation in a fully automatic manner, a determination may be made regarding outside environmental conditions, e.g. sunlight intensity, temperature and humidity. The outside conditions of the vehicle 100 may include determining whether it is rainy, snowy, with excessive sunlight, highly humid or the like. The temperature sensor 111, the humidity sensor 113 and the light sensors 120 may be considered as exemplary implementations of some of the sensors of the outside sensing system 304b. If the temperature, humidity or sunlight intensity are determined by the sensors to be greater than a certain range representing threshold values, then the controller 302 may trigger the opening process 400 of the covering system 300. Light sensors 120 and temperature sensors 111 may be stimulated by the excessive sunlight intensity and the extreme temperature and the humidity sensor 113 may be stimulated by high humidity that occurs before and during rain, snow and so on. If the control system 308 is set on the automatically triggered (auto) mode through the remote control 301, the covering system 300 may be triggered to operate through a stimulating signal receiving from one of these sensors. Also, if the control system 308 is set on the manually triggered (manual) mode using the remote control 301, the covering system 300 may be activated upon receiving a signal from the remote control 301 decided by user.

Referring to FIGS. 1 and 2, before conducting the opening process 400, the minimum distance of the vehicle 100 from barriers in parking location may be determined. If the distance is greater from a predefined value, the controller 302 may trigger the opening process 400. The distance sensor 122 may be considered as an example implementation of a sensor of the outside sensing system 304a. In one example implementation the distance sensor 122 may be mounted on the rear bumper 102 of the vehicle 100 to sense the distance of the rear bumper 102 from the backside barrier. Such a minimum distance may be required for the folded cover and arms 306b to come out of the enclosure 106 without collision.

After ensuring that there is a minimum allowable distance outside of the rear bumper 102, the control system 308 may provide a series of consecutive signals for a number of different mechanisms of the actuating system 303. The cover 306d in its folded state which is attached to the arms 134a and 134b, may be forced to come out of the enclosure 106. In this state the flashers 108 may be allowed by the control system 308 to be turned on. Also, a warning alarm may be played by the controller 302 through the vehicle's speaker 114 to keep people informed of the process.

Referring to FIG. 1, if the distance, between the vehicle 100 and barriers in the parking location, is distinguished by the control system 308 to be less than a required minimum value, then the controller 302 may notify the driver. In this state, an alarm may be played and the reverse gear lights 110 may be turned on and made to flash so that the driver is signaled to that the opening process 400 may not be operational due to the short distance. After changing the location of the vehicle 100 in a way that the minimum distance regulation is complied with, the controller 302 may allow the opening process 400 to be triggered either manually or automatically. The electric current required for electronic systems, the control systems 308 and different mechanisms of the actuating system 303 may be produced by a battery 112 that may work individually or along with the vehicle's battery.

When the cover 306d is in a fully opened state, the controller 302 may cause the movement of the cover 306d and the playing of warning alarm through the speaker 114 to be stopped. The flashers 108 of the vehicle 100 may be also turned off. In this state, the controller 302 may be in a standby mode. It means that it is possible to trigger activation of the closing process 500 by the control system 308 upon the user's request using the remote control 301.

Figure 3B:
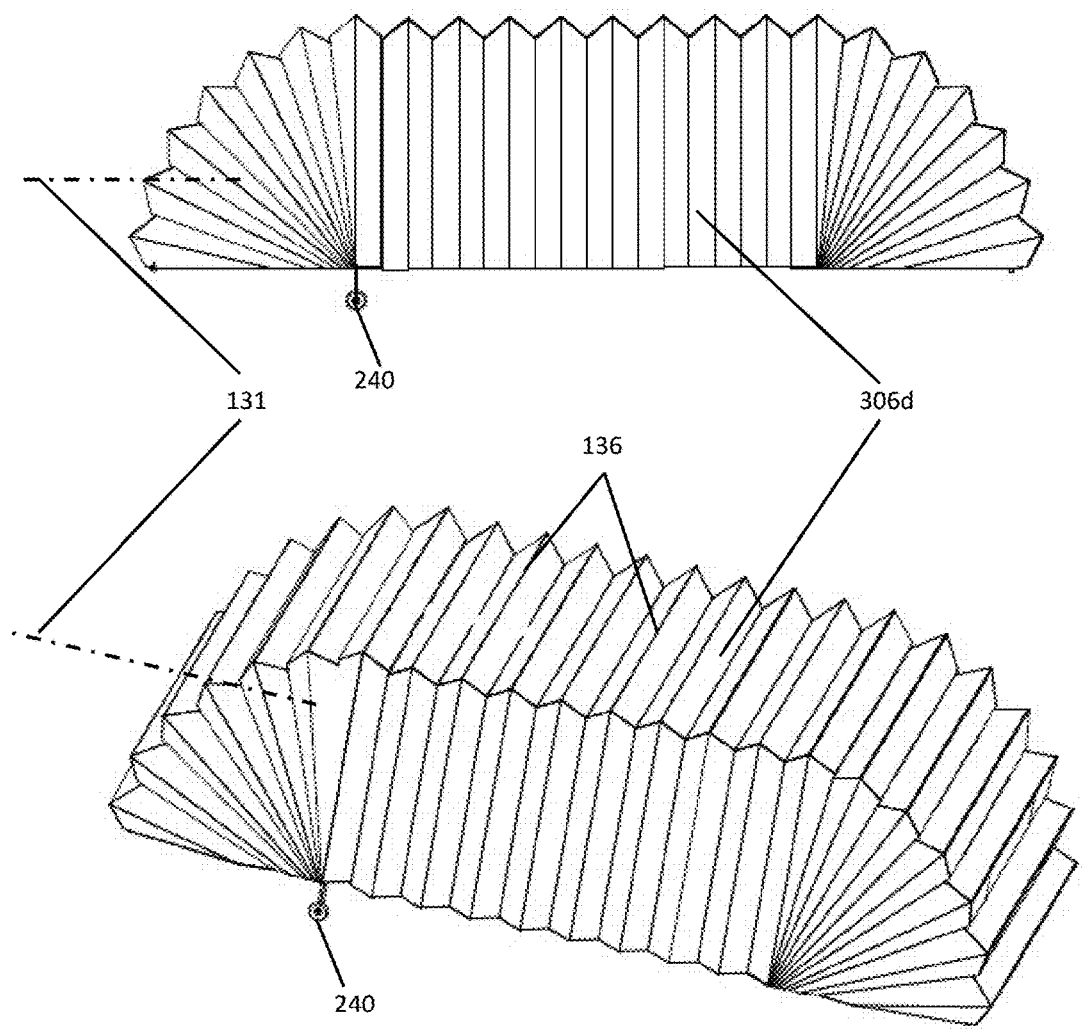
FIG. 3B illustrates two different exemplary views of a cover in a fully opened state for an example of an accordion-pleated form, consistent with one or more exemplary embodiments of the present disclosure.

FIG. 3B, illustrates two views of the cover 306d in a fully opened state. The cover 306d may have an accordion-pleated form which may be formed based on a pre-defined pattern facilitating the folding and unfolding processes. During the opening process 400, folds 136 of the cover 306d may be opened along a longitudinal axis 131 of the vehicle 100. When the cover 306d fully wrap the vehicle 100, it may appear as a hollow accordion shaped box which protects all sides of the body of the vehicle 100, which is mounted on the arms 134a and 134b on either sides of the vehicle 100 and on movable guiding devices 240. The movable guiding devices 240 may be mounted on either sides of the front section of the cover 306*d* facilitating the movements of the cover 306*d* during the opening process 400 or closing process 500.

Figure 4A:
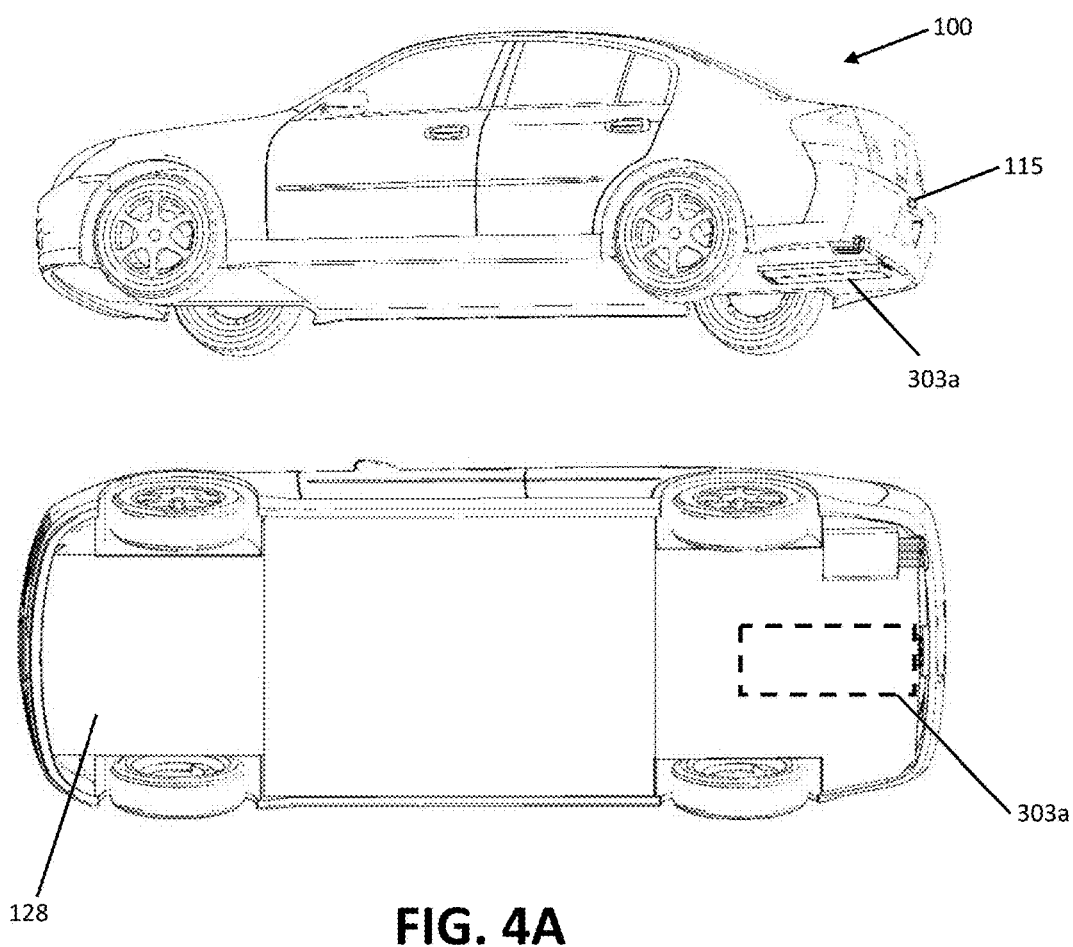
FIG. 4A illustrates an exemplary approximate position for mounting a first displacing mechanism and an exemplary approximate position for a locking mechanism in an exemplary vehicle, consistent with one or more exemplary embodiments of the present disclosure.
Figure 4B:
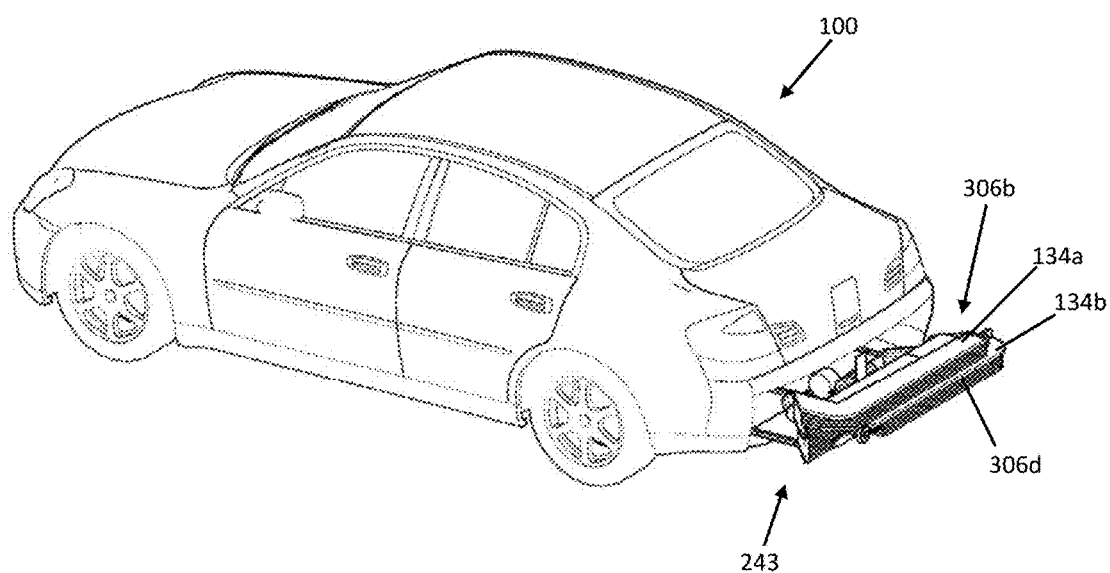
FIG. 4B illustrates an exemplary folded cover and arms in a position out of an enclosure and parallel to a rear bumper after being taken out of an enclosure.

Referring to FIG. 4B, when the folded cover and arms 306*b* are taken out of the enclosure 106, they may be placed parallel to the rear bumper 102 and the ground as a folded set. The folded cover and arms 306*b* may be displaced linearly along the longitudinal axis 131 of the vehicle 100, shown in FIG. 3B, through an actuation caused by the second displacing mechanism 303*b*. The controller 302 may force the second displacing mechanism 303*b* to either actuate the process of taking the folded cover and arms 306*b* out of the enclosure 106 or inside the enclosure 106.

Figure 5:
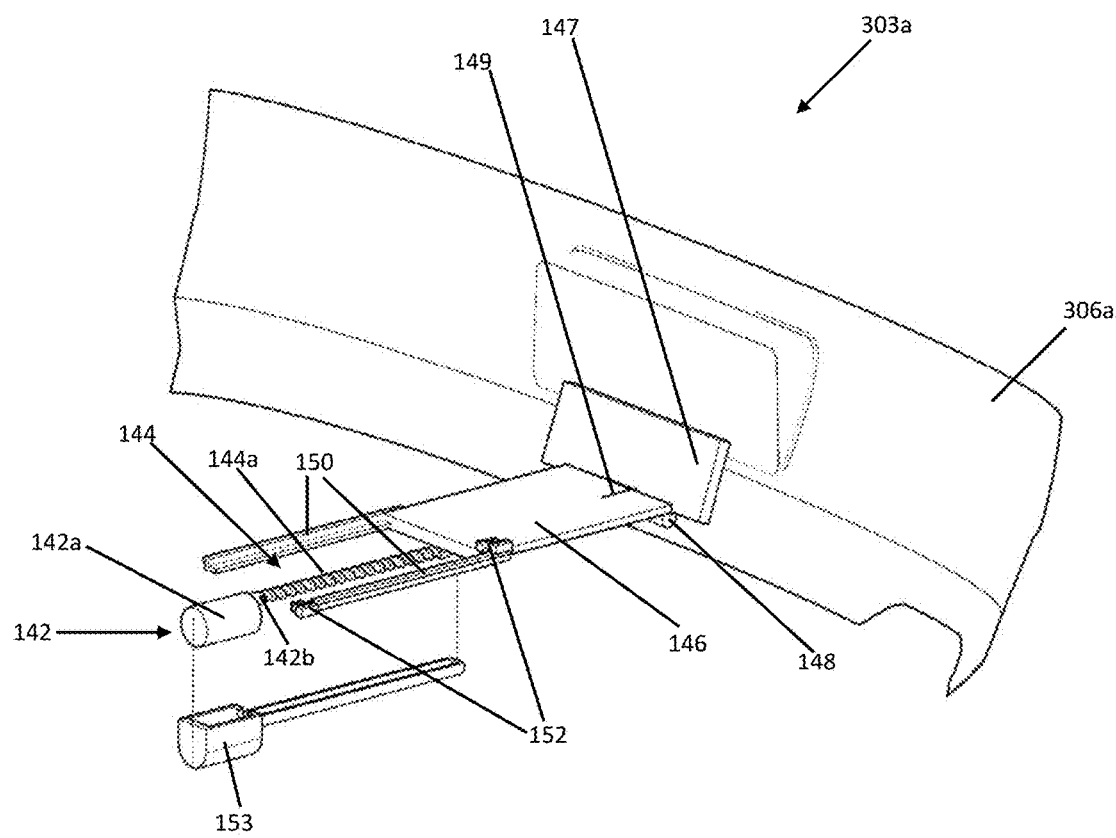
FIG. 5 illustrates an example implementation of a first displacing mechanism for displacing an exemplary wall of a rear bumper, consistent with one or more exemplary embodiments of the present disclosure.

FIG. 5 shows one exemplary implementation of the linear first displacing mechanism 303*a* configured to displace the movable wall of the rear bumper 306*a*. This mechanism may be able to deliver a linear output movement along the longitudinal axis 131 of the vehicle 100. The output of the first displacing mechanism 303*a* may be attached to the movable wall of the rear bumper 306*a*. The displacement course of the first displacing mechanism 303*a* may be defined between a first position of the movable wall of the rear bumper 306*a* on the rear bumper 102 and a second position of the movable wall of the rear bumper 306*a* under the bottom 128 of the vehicle 100. In the second position, the movable wall of the rear bumper 306*a* may be placed under the bottom 128 of the vehicle 100 in the opening process 400. In the closing process 500 the displacement positions may be reversed from the second position to the first position. The displacement course and successive actuations of the first displacing mechanism 303*a* may be controlled by the control system 308.

Referring to FIG. 5, the first displacing mechanism 303*a* may include a rotary actuator 142, a converting mechanism 144, and an intermediate link 146 attached to the movable wall of the rear bumper 306*a* from one side and engaged with the converting mechanism 144 from the other side. The first displacing mechanism 303*a* may further include a set of two parallel guiding rails 150 that may be mounted on the bottom of vehicle 128 at either sides of the link 146 defining the required path for the movements of the link 146, two location sensors 152 that may be placed at either sides of the displacement course of the movable wall 306*a* to inspect the displacement to be in the defined range.

In some implementations, the rotary actuator 142 may include a motor 142*a* and its associated gearbox 142*b* and may be mounted on the bottom 128 of the vehicle 100 to provide the required rotational power and transmission for displacing the movable wall of the rear bumper 306*a*.

In an exemplary implementation, the converting mechanism 144 may be coupled with the output shaft of the rotary actuator 142 at one end and rotatable therewith and coupled with the intermediate link 146 at the other end, converting the rotational power and displacement to the linear power and displacement. The converting mechanism 144 may be in the form of a set of a threaded rod 144*a* engaged with a nut or a ball screw assembly. In the former form, the nut may be mounted under the bottom of the intermediate link 146, causing the intermediate link 146 to linearly displace as the threaded rod 144*a* linearly moves.

In some implementations, the intermediate link 146 may be placed between the converting mechanism 144 and the moveable wall of the rear bumper 306*a*. The intermediate link 146 may move linearly with the output of the converting mechanism 144. The intermediate link 146 may receive and transmit the power and linear displacement from the converting mechanism 144 to the movable wall of the rear bumper 306*a* and cause the movable wall of the rear bumper 306*a* to displace. The intermediate link 146 may act as a linkage element which may be connected to the movable wall of the rear bumper 306*a* by a hinge 148 and a spring 149. A link 147 may be located as a connecting linkage between the intermediate link 146 and the movable wall of the rear bumper 306*a*. The hinge 148 may be configured to transmit the power to the movable wall of the rear bumper 306*a* and cause a change of direction in its displacement course from a linear path to a curved path and vice versa. The spring 149 may be configured to provide the required restoring force. When the controller 302 activates the first displacing mechanism 303*a* to displace the movable wall of the rear bumper 306*a*, one of the sensors 152 may sense the displacement course in the opening process 400 to be in the defined range and another sensor 152 may sense the movement of the intermediate link 146 in the reverse displacement. The sensors 152 may determine the end of displacement and inform the controller 302 from the end of displacing operation.

The motor 142*a* may be configured to start rotating after receiving the activating signal from the controller 302, sending the power to a threaded rod 144 through the output shaft of a gearbox 142*a* and causing the threaded rod 144 to rotate therewith. The threaded rod 144*a* engaged with a nut may convert a rotational movement of the motor 142*a* to a linear movement of the intermediate link 146 along the path defined by guiding rails 150. A ball screw assembly also may be configured as another example implementation of the converting mechanism 144. The moveable wall of the rear bumper 306*a* is connected with the intermediate link 146 by attachment to the hinge 148 and the spring 149 and a connecting link 147, may be forced to displace accordingly therewith.

Referring to FIGS. 5 and 4A, in one exemplary implementation, the first displacing mechanism 303*a* may be placed under the bottom 128 of the vehicle 100. The fixed parts of the mechanism 140 may be mounted on the bottom 128 of the vehicle 100 and a casing 153 may be placed thereon. Also, it is possible to mount the elements in an external housing box, which may be mounted in the vehicle 100.

Figure 6:
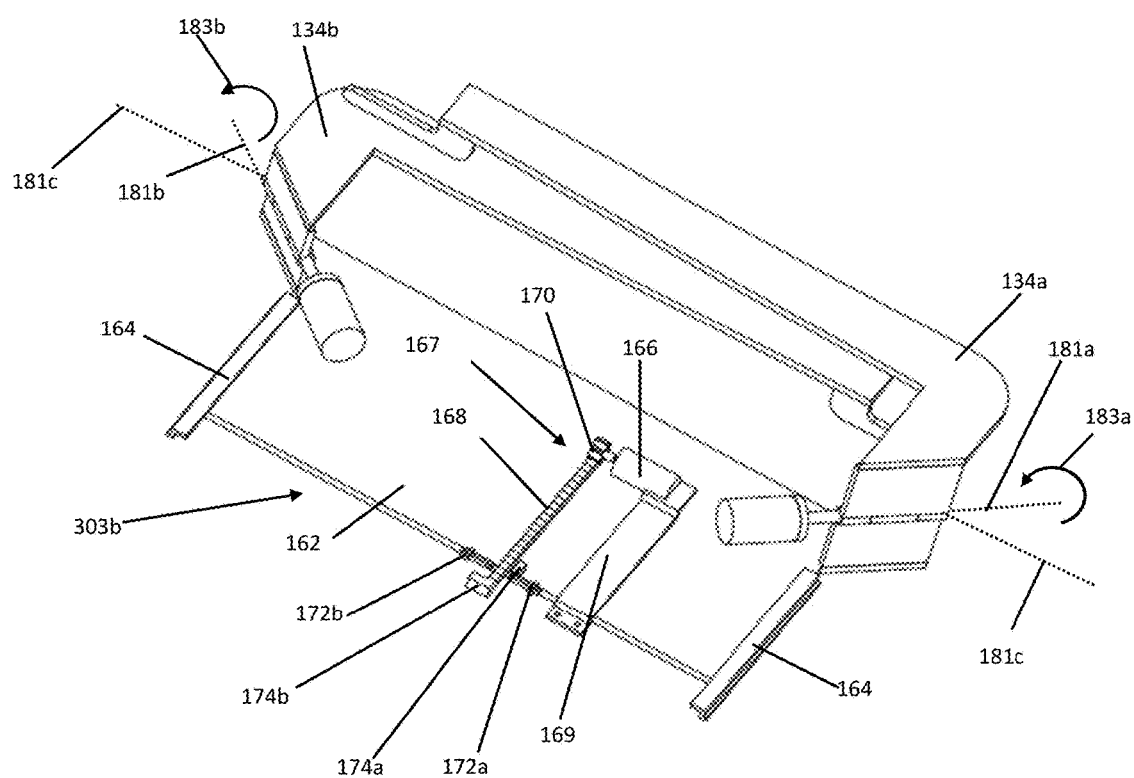
FIG. 6 illustrates an example implementation of a second displacing mechanism for taking an exemplary folded cover and arms in and out of an enclosure and an example implementation of an opening/closing mechanism, consistent with one or more exemplary embodiments of the present disclosure.

FIG. 6 shows the second displacing mechanism 303*b* for linearly displacing the folded cover and arms 306*b* outside or inside of the enclosure 106. After opening the movable wall of the rear bumper 306*a*, the controller 302 may force the linear second displacing mechanism 303*b* to take the folded cover and arms 306*b* out of the enclosure 106. In one exemplary implementation, this mechanism may include a movable mounting plate 162 configured to undergo linear movement between a first position and a second position, a set of two guiding rails 164 mounting at either sides of the enclosure 106 parallel to the longitudinal axis 131 of the vehicle 100 defining a path for the displacement of the movable mounting plate 162, a motor 166 providing the power for displacing the movable mounting plate 162 mounted on the bottom of the enclosure 106 without any direct attachment to the movable mounting plate 162, a converting mechanism 167 configured to convert the rotational output motion of the geared motor 166 to a linear displacements in the movable mounting plate 162, two location sensors 172*a* and 172*b*, mounted at either sides of the converting mechanism 167 configured to sense the displacement of the movable mounting plate 162 to be in a certain range allowing the displacement to be performed between the first position and the second position.

In one exemplary implementation, the converting mechanism 167 may be considered to be a set of rack 168 and pinion 170 gears, wherein the pinion gear 170 coupled with the output shaft of the motor 166 and rotatable therewith engaging with the rack gear 168. The rack gear 168 may be mounted on the movable mounting plate 162 along the longitudinal axis 131 of the vehicle 100. The pinion gear 166 may drive the rack gear 168. The rack gear 168 which is attached to the movable mounting plate 162 may be displaced linearly outward or inward of the enclosure 106, causing the movable mounting plate 162 to be taken outside or inside of the enclosure 106, therewith. Two appendages 174a and 174b, mounted at the end of the displacement course of the movable mounting plate 162, may be configured to determine the allowable displacement course for the sensors 172a and 172b. The sensors 172a and 172b may also inform the controller 302 of the fully extracting the folded cover and arms 306b from the enclosure 106 in the opening process 400 or fully taking the folded cover and arms 306b inside the enclosure in the closing process 500. The data from the sensors 172a and 172b may be sent to the controller 302 in order to determine the next control decision by the controller 302.

In one implementation, the second displacing mechanism 303b may be located in an enclosure, for example, either exemplary enclosure 106 (or another enclosure) which allows the folded cover and arms 306b along with the opening/closing mechanism 303c to be linearly taken in or out of the enclosure 106. In one exemplary implementation shown in FIG. 6, the rack gear 168 may be attached to the movable mounting plate 162. The folded cover and arms 306b may be attached to the output of the opening/closing mechanism 303c. The opening/closing mechanism 303c may be attached to the movable mounting plate 162 and placed inside the enclosure 106. Thus, the movable mounting plate 162 and the rack gear 168 may be also placed inside the enclosure 106. The activation and actuations of the second displacing mechanism 303b may be controlled by the control system 308.

After taking the folded cover and arms 306b out of the enclosure 106, it may be in a position parallel to the rear bumper 102 as shown in FIG. 4B. In this position, the arms 134a and 134b may be placed in a first position, wherein the arms 134a and 134b may be in a closed state parallel to the rear bumper and the ground, lying on each another. The cover 306d in its folded state may be attached to the arms 134a and 134b in this position. The arms 134a and 134b may be opened from this position, thereafter as part of an exemplary opening process 400. The second position of the arms 134a and 134b may be defined as a state parallel to either sides of the vehicle 100 and the ground.

The opening process 400 of the arms 134a and 134b may be activated by the control system 308 using the opening/closing mechanism 303c configured to open or close the arms 134a and 134b in the folded cover and arms 306b from their first position to their second positions. The arms 134a and 134b may be opened or closed subsequently one after another in a way to avoid collision of the arms 134a and 134b.

The procedures for the opening or closing are different for the vehicles 100 with the specific trunk 104 which are mostly the vehicles 100 in sedan class and the vehicles in other different classes like SUVs, vans, wagons, hatchbacks, etc., without having a specific trunk 104. For example, in sedan class of the vehicles 100, the opening and closing of the arms 134a and 134b may be performed in one rotational movement around a pivot. The pivot may be defined by the point of connection of the arms 134a and 134b to their respective opening/closing mechanism 303c. The axis of rotation of each arm 134a or 134b makes a 45-degree angle relative to the horizontal axis, in other classes of the vehicles 100, the opening and closing of the arms 134a and 134b may be performed in a set of three successive rotational movements controlled by the control system 308. Upon undergoing the opening process, the arms 134a and 134b in the opened state along with the cover 306d, which is still folded, may appear as a U-shaped set forming around the backside of the vehicle 100, allowing for the cover 306d to be unfolded. The U-shaped form of the arms 134a and 134b in the opened state are shown in FIGS. 7A and 7B.

Figure 7A:
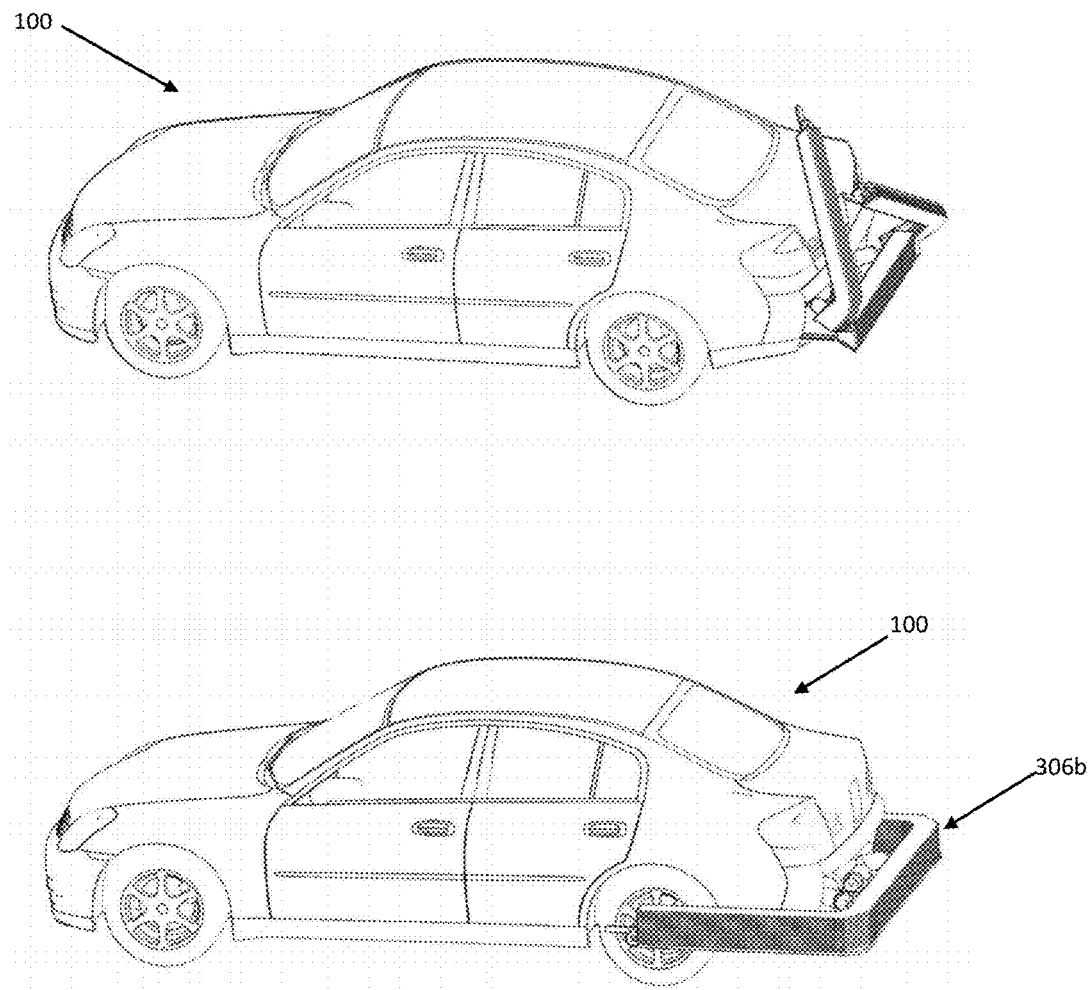
FIG. 7A illustrates two exemplary positions of arms in an opening process in an exemplary vehicle with a specific trunk as a rotational movement in an example implementation, consistent with one or more exemplary embodiments of the present disclosure.
Figure 7B:
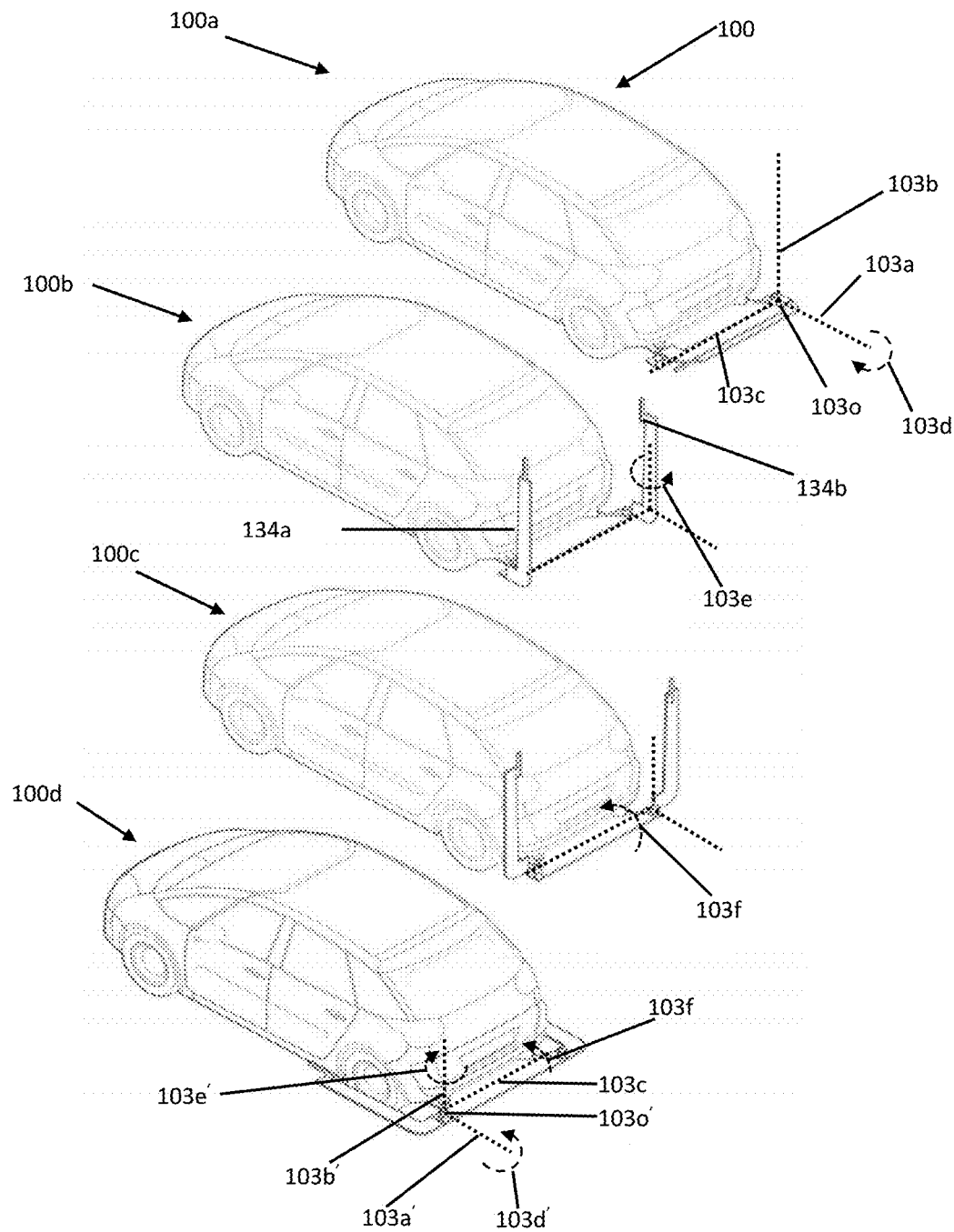
FIG. 7B illustrates an exemplary implementation of an opening process of arms for an exemplary automatic vehicle cover in a vehicle without a specific trunk section showing different exemplary steps, consistent with one or more exemplary embodiments of the present disclosure.
Figure 8A:
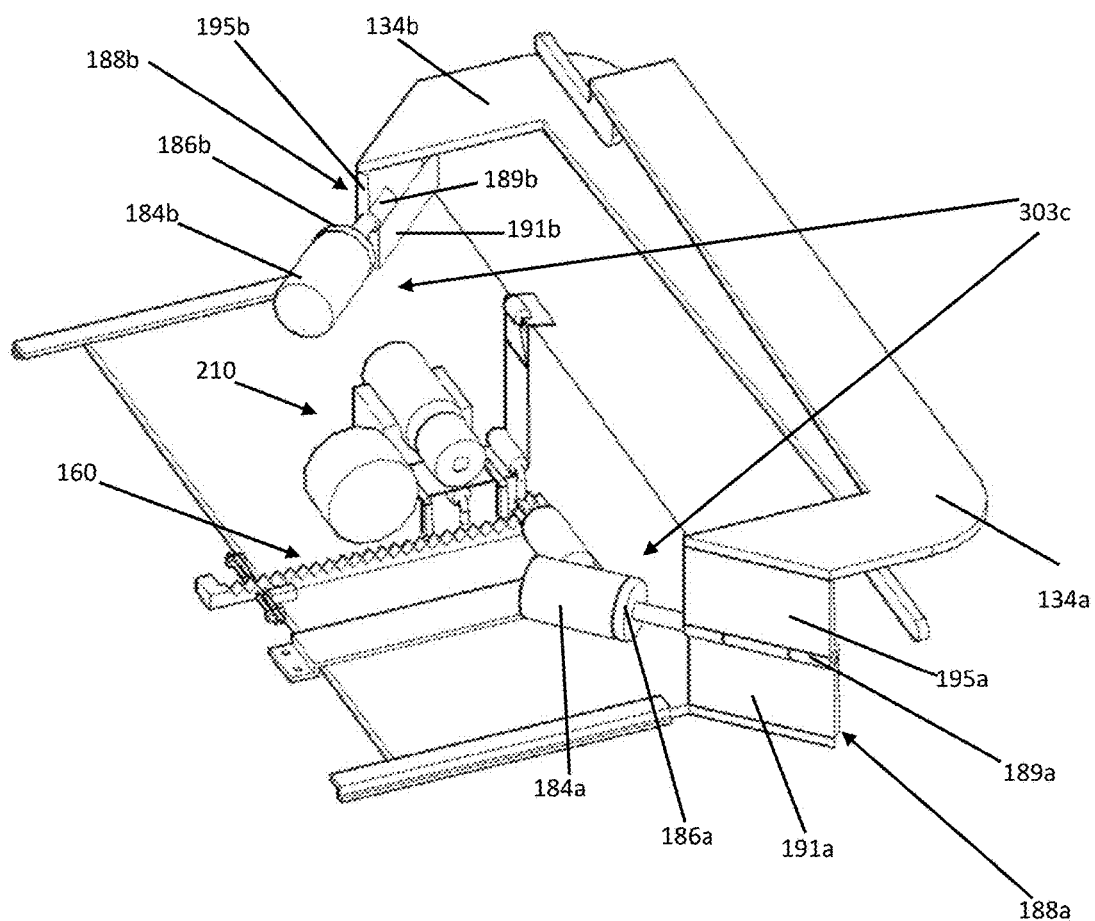
FIG. 8A illustrates an schematic example implementation of an opening/closing mechanism for opening or closing exemplary arms along with a second displacing mechanism and a folding mechanism, consistent with one or more exemplary embodiments of the present disclosure.

Referring to FIGS. 6, 7A and 8A, in an exemplary sedan class of the vehicles 100, each one of the arms 134a and 134b may open or close in a rotational movement around a pivotal line of connection shown as an axis 181a or 181b making a 45-degree angle with the horizontal axis 181c. The arms 134a and 134b may rotate around the axis 181a or 181b in order to relocate from the first position parallel to the rear bumper and the ground to the second position parallel to the sides of the vehicle 100 and the ground as a part of the opening process 400 of the covering system 300.

Figure 8B:
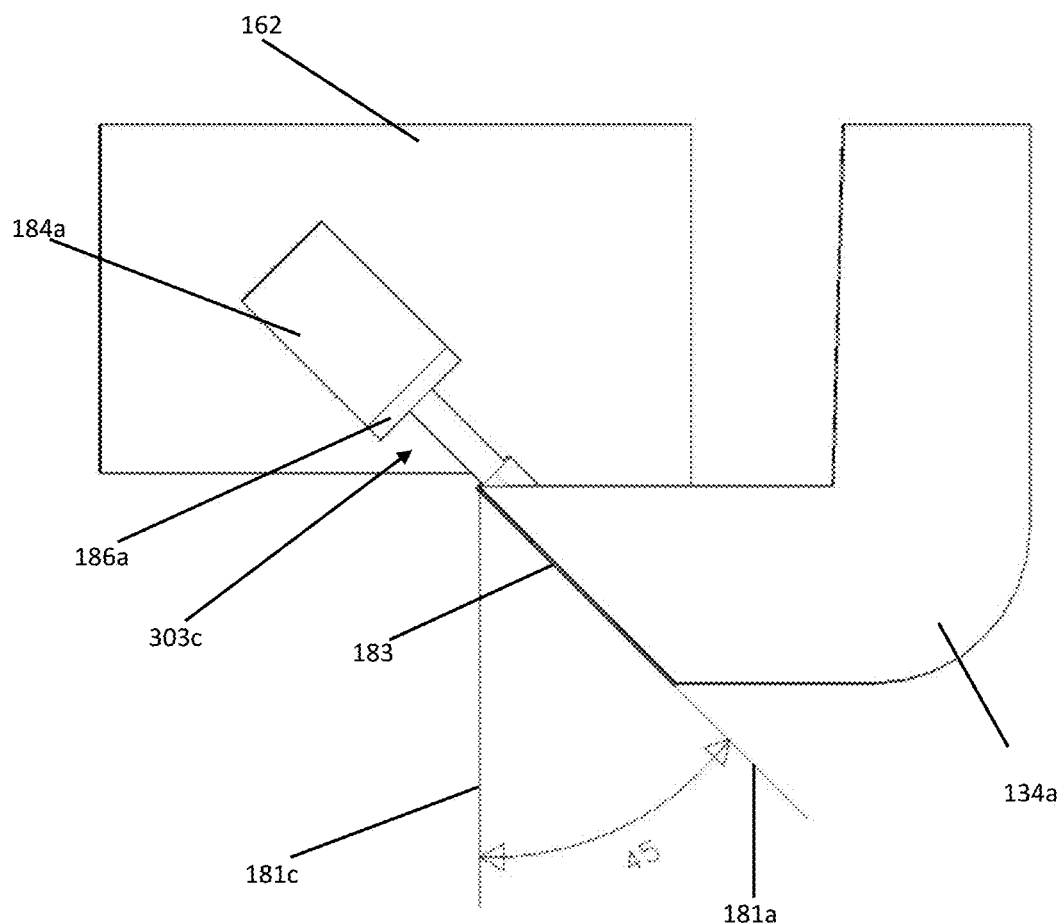
FIG. 8B illustrates a top view of an example implementation of an opening/closing mechanism for rotationally opening or closing arms specific to a vehicle with a trunk, consistent with one or more exemplary embodiments of the present disclosure.

Two sets of the opening/closing mechanism 303c shown in FIGS. 8A and 8B may be configured for opening and closing the arms 134a and 134b. Referring to FIG. 8A, in one exemplary implementation, each one of the opening/closing mechanism 303c may include motors (or geared motor) 184a or 184b, providing the required power for the rotational movement, each one coupled with the respective arms 134a or 134b, two hinges 188a and 188b, each attached to the movable mounting plate 162 and also to the respective arms 134a and 134b, transmitting the rotation of the motor 184a or 184b to the arms 134a and 134b causing to the arms 134a and 134b to rotate, a sensor 186a or 186b configured to sense the rotational displacement of the arms 134a and 134b mounted on the output of the motor 184a or 184b. The motors 184a and 184b may be mounted on the movable plate 162 and linearly movable therewith with the mounting orientation in which the output shaft of the geared motor 184a or 184b may be placed in line with the axis of rotation 181a or 181b. The geared motor 184a or 184b may be connected to the arms 134a or 134b using respective hinges 188a or 188b.

Each one of the hinges 188a or 188b may include a central axis 189a or 189b and two leaves 191a and 195a or 191b and 195b. Each one of the hinges 188a or 188b may be coupled with the output of the respective motor 184a or 184b through the central axis 189a or 189b to the output of the motor 184a or 184b and rotatable therewith. The lower leaf of each hinge 191a or 191b, is mounted on the movable mounting plate 162 and the upper leaf of each hinge 195a or 195b, may be attached to a proximal end 139a of the respective arms 134a or 134b. The rotational displacement of the arms 134a or 134b may be performed around this attaching line.

Referring to FIG. 6, when the respective sensor 172a on the moveable mounting plate 162 of the second displacing mechanism 303b send a signal to the controller 302 determining full extraction of the folded cover and arms 306b from the enclosure 106, the controller 302 may activate the geared motors 184a and 184b to rotate a predefined direction shown by arrows 183a and 183b in FIG. 6. In this state, the motors 184a and 184b may be displaced outside of the enclosure 106. As a result of the rotation of the motors 184a or 184b the attached hinge 188a or 188b may also rotate due to rotation of its central axis 189a or 189b which is coupled with the output shaft of the motor 184a and 184b. The hinge's upper leaf 195a and 195b may rotate accordingly, through which the attached arms 134a or 134b may also be rotationally displaced. As a result, the arms 134a and 134b may rotate around the axis 181a and 181b and may be displaced from the first position to the second position of the arms 306b. The sensors 186 may sense the rotation of the arms 134a or 134b and inform the controller 302 of the angle of rotation of the motor 184a and 184b. One of the arms 134a or 134b may be lie on the other arm 134a or 134b in the folded position. After beginning the opening procedure for the first arm 134a or 134b, the second arm 134a or 134b may start opening after a specific time delay set by the control system 308. It means one of the opening/closing mechanisms 180a or 180b may be activated before the other one 180a or 180b.

Figure 9A:
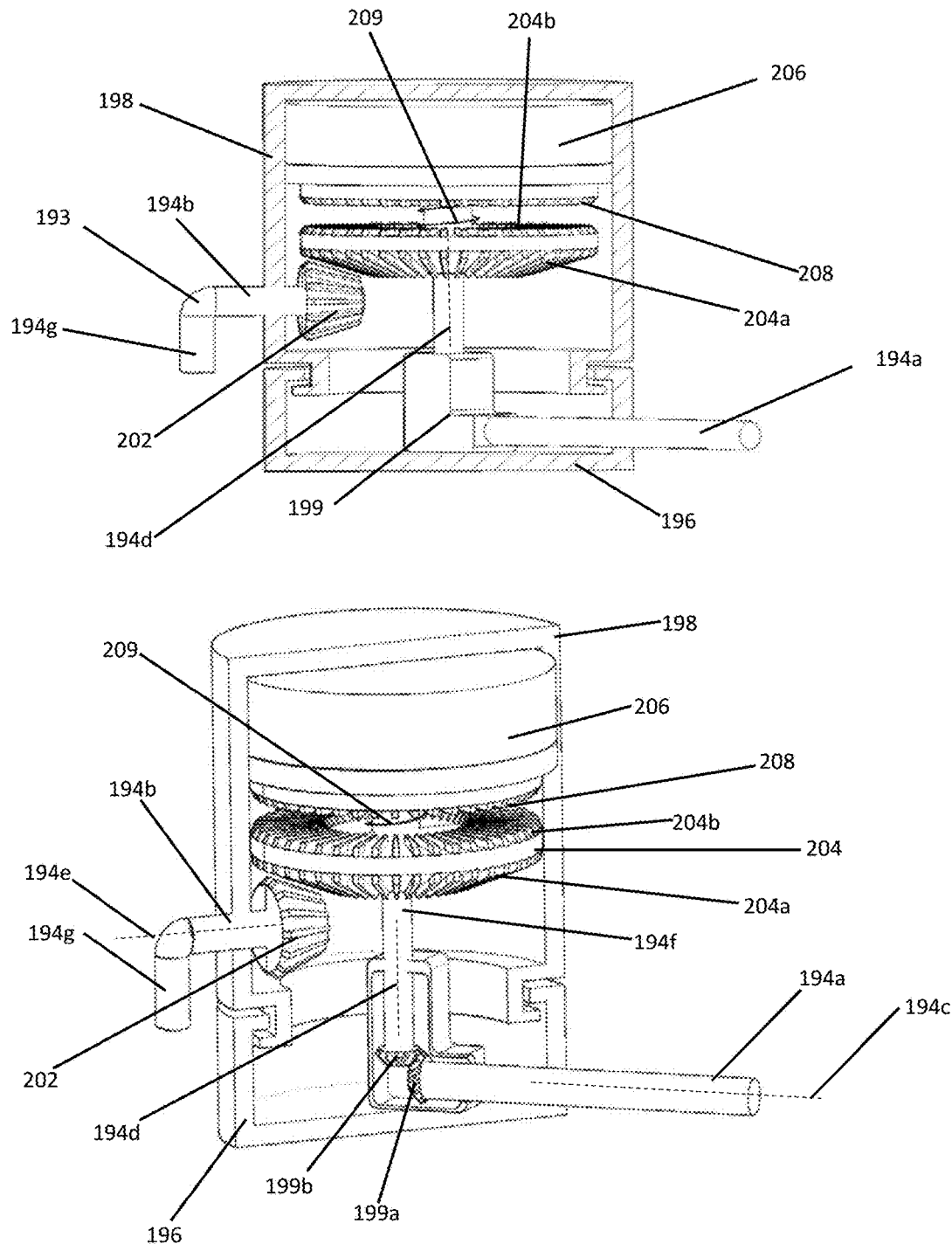
FIG. 9A illustrates sectional views of an example implementation of a gearbox mechanism through which the rotational movements of arms can be implemented in vehicles without a specific trunk section, consistent with one or more exemplary embodiments of the present disclosure.
Figure 9B:
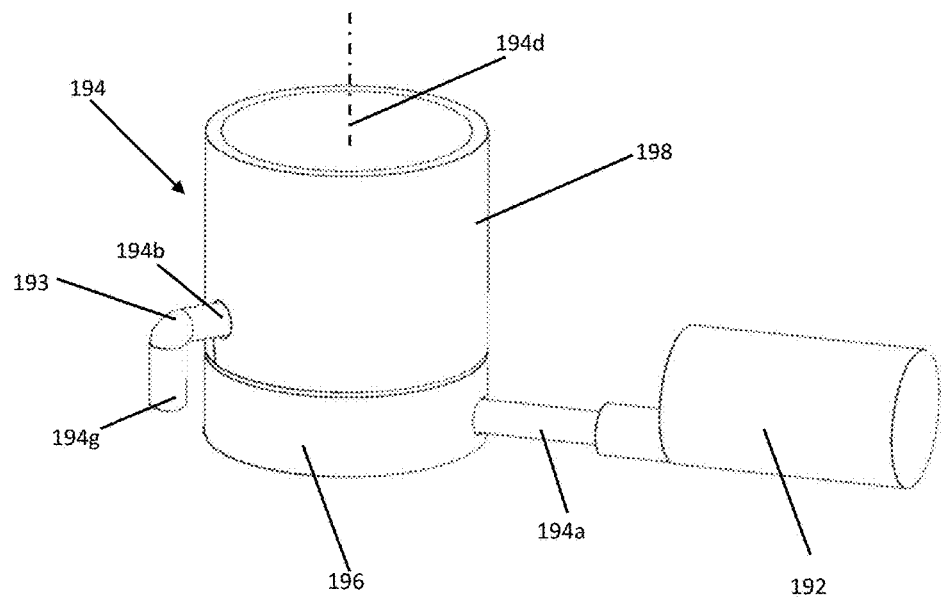
FIG. 9B illustrates a perspective view of an example implementation of an opening/closing mechanism for a vehicle without trunk including an exemplary gearbox mechanism through which the rotational movements of arms can be implemented in vehicles without a specific trunk section, consistent with one or more exemplary embodiments of the present disclosure.
Figure 9B:
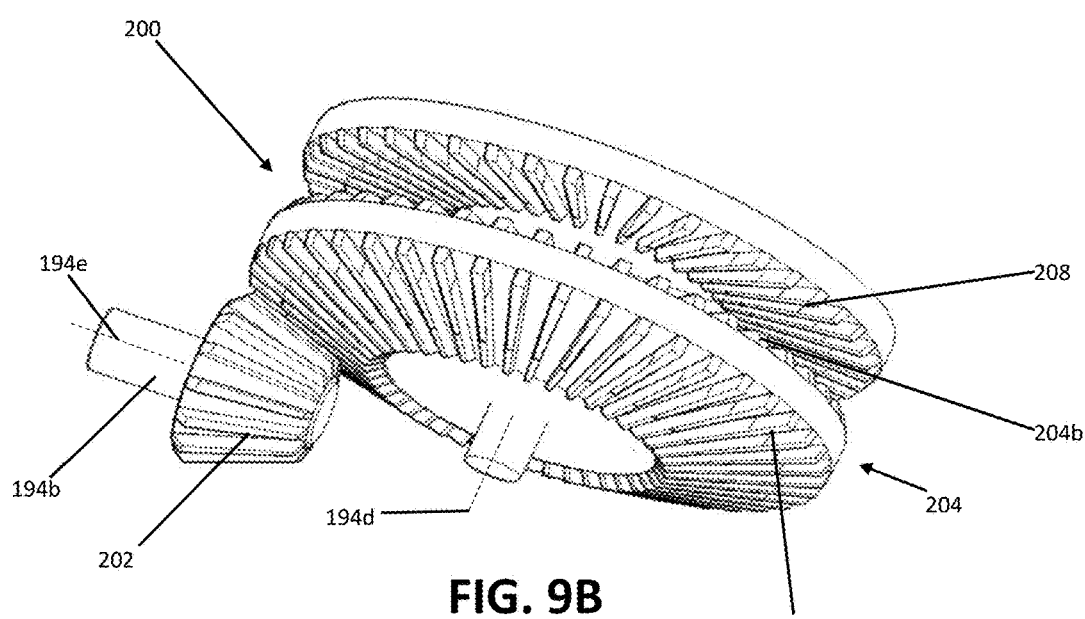
Figure 9C:
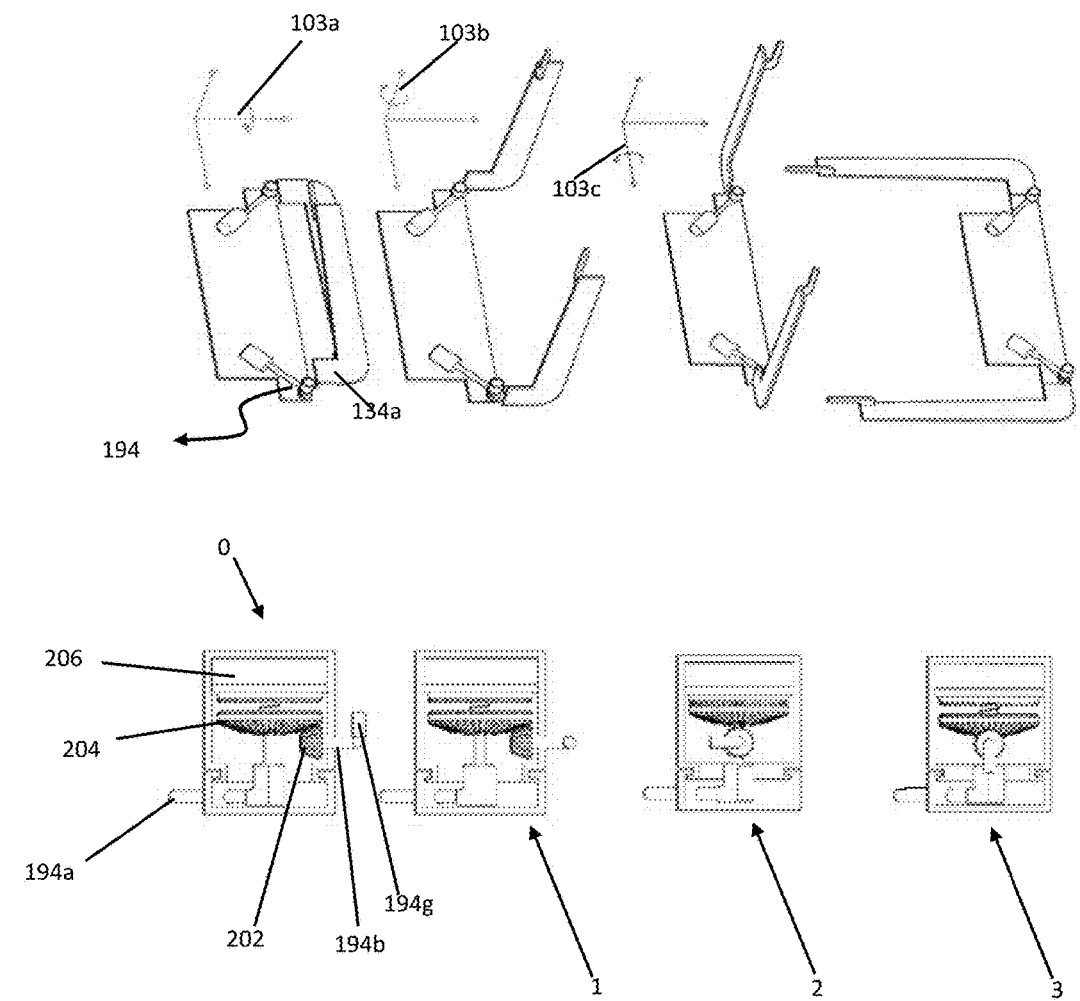
FIG. 9C illustrates schematic views of three exemplary consecutive rotational movements of arms in an exemplary opening process along with orientation of an exemplary gearbox mechanism in vehicles without a specific trunk section, consistent with one or more exemplary embodiments of the present disclosure.
Figure 9D:
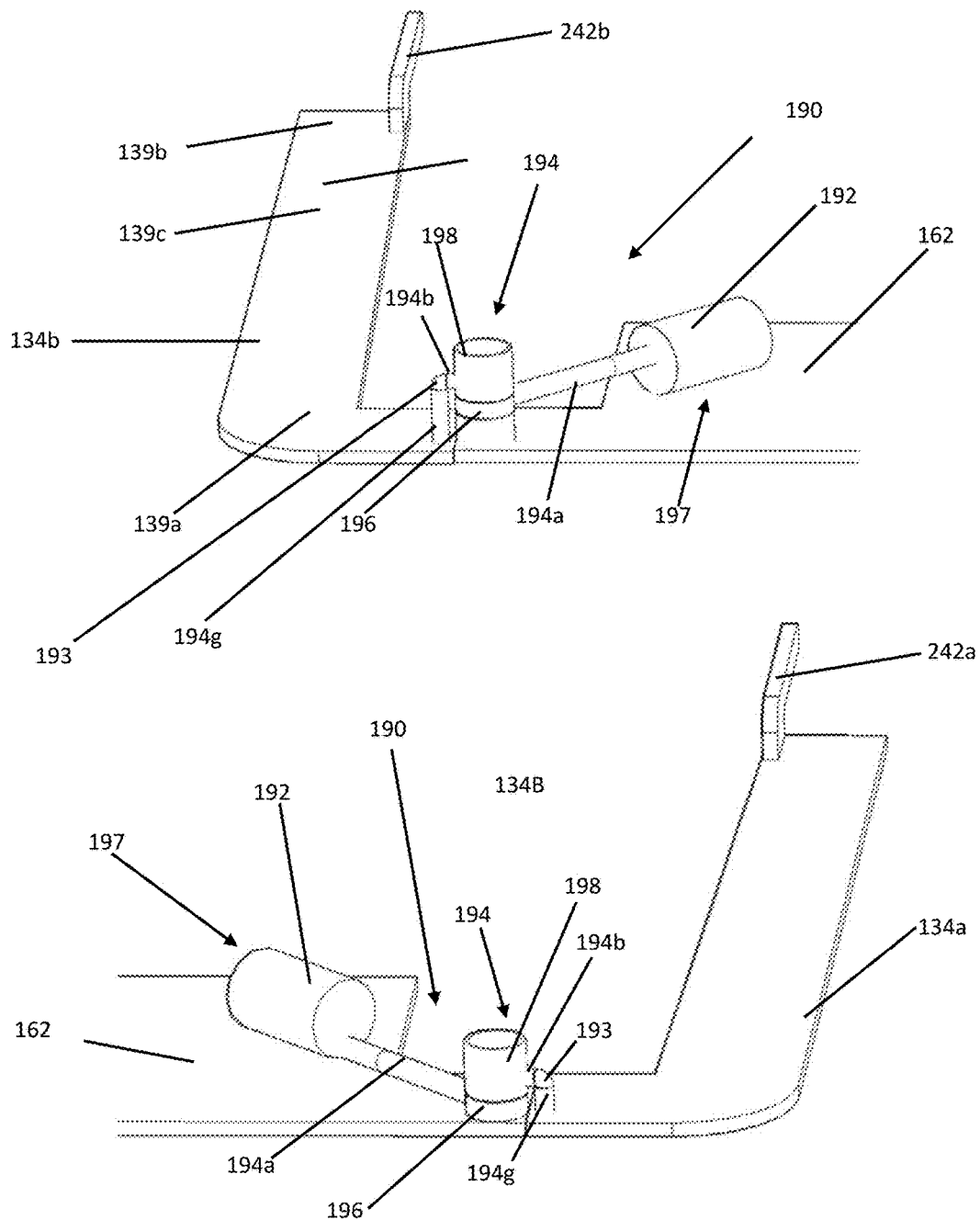
FIG. 9D illustrates two schematic views of an example implementation of an opening/closing mechanism for rotationally opening or closing arms in vehicles without a specific trunk section, consistent with one or more exemplary embodiments of the present disclosure.

Referring to FIG. 9D, the arms 134a and 134b may have a proximal end 139a, a distal end 139b, and an upper surface 139c. The proximal end 139a may be attached to hinge devices 188a or 188b or to the output shaft 194b of a gearbox mechanism 194. The connecting point 193 may be used as a pivot for rotation of the arms 134a and 134b. The first fold 136a of the cover 306d may be attached to the upper surface 139c of the arms 134a and 134b.

Referring to FIG. 7B, the opening and closing procedures of the arms 134a and 134b in the vehicles 100 without a specific trunk may be different compared with sedan class of the vehicles 100. Each arm 134a or 134b may undergo a series of three successive rotational movements. The arm 134a or 134b which is placed at the top may be first triggered by the controller 302 to take the opening action ahead of the other arm 134a or 134b. A coordinating system may be defined by a set of mutually perpendicular axes 103a, 103b and 103d. The origin of this coordinate system may be placed at the point 103o attached to the pivotal connecting point 193. The axis 103a, may be parallel to the longitudinal axis 131 of the vehicle 100, also known as roll axis. The axis 103b, may be parallel to the axis perpendicular to the ground, also known as yaw axis. The axis 103c, may be parallel to the transversal axis of the vehicle 100, also known as pitch axis. The axes 103a', 103b' and 103d' may be parallel to axes 103a, 103b and 103d, respectively passing through the pivotal connecting point 103o'. The points 103o and 103o' may be respectively attached to the pivotal connecting points 193 of the proximal ends 139a of the arms 134a and 134b to the movable mounting plate 162. In state 100a, the folded cover and arms 306b may be parallel to the back of the rear bumper 102 after being taken out of the enclosure 106. The first rotational movement may be performed around the axis 103a along the arrow 103d. As a result the arms 134a or 134b may be placed in the position 100b perpendicular to the ground. The next step may be a rotational movement around the axis 103b, in a direction shown by arrow 103e, causing the arms 134a and 134b to place in a position shown in state 100c. Then the next rotational movement may be done around the axis 103c in a direction shown by arrow 103f, causing the arms 134a and 134b to take the shape shown in state 100d. After undergoing the whole opening process the arms 134a and 134b in the opened state and the cover 306d in its folded state may take a U-shaped form. In the closing process of the arms 134a and 134b the explained procedure may be performed in a reverse direction.

The opening of the arms 134a and 134b in the non-sedan class of the vehicles 100 may be performed by another opening/closing mechanism 190 which may allow the arms 134a and 134b to undergo three successive rotational movements. The opening/closing mechanism 190 shown in FIG. 9D may be considered as another example implementation of the opening/closing mechanism 303c of FIG. 2. The opening/closing mechanism 190 may include a rotary actuator 197, which may include a geared motor 192, configured to provide power for rotational movements of the arms 134a and 134b, mounted on the movable mounting plate 162; and a gearbox mechanism 194, having an output shaft 194b and an input shaft 194a coupled with an output shaft 194a of the geared motor 192 and may be configured to provide the arms 134a and 134b with three successive rotational movements. The gearbox mechanism 194 may be mounted on the movable mounting plate 162 and movable therewith. The output shaft 194b of the gearbox mechanism 194 may be attached to the proximal end 139a of the respective arm 134a or 134b. The gearbox mechanism 194 may be taken in or out of the enclosure 106, so that it may be activated by the controller 302 to open or close the arms 134a and 134b. The control system 308 may activate the gearbox mechanism 194 and determine the timing and sequence of the three successive rotational movements.

Figure 11A:
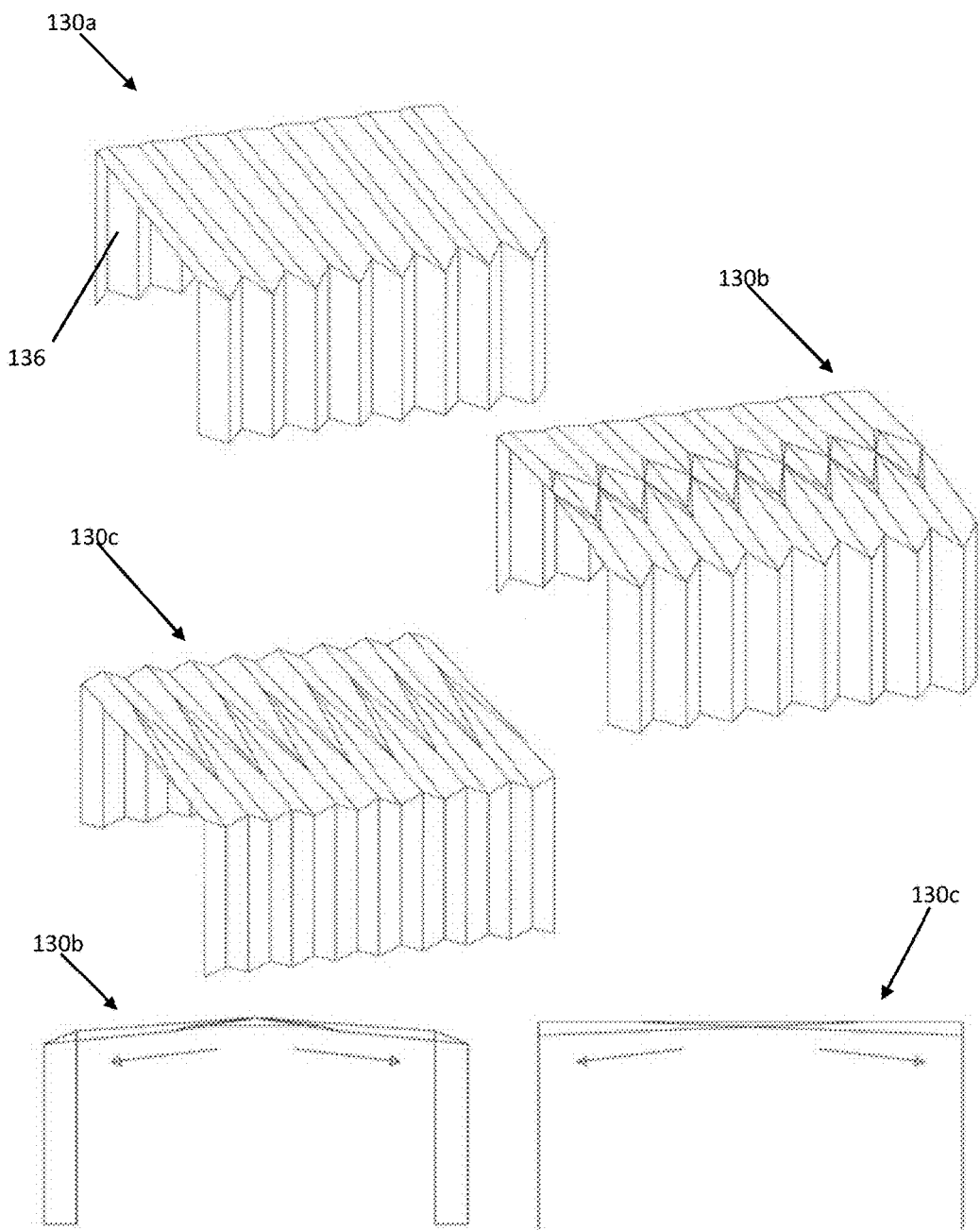
FIG. 11A illustrates three different example implementations of an accordion-pleated foldable cover having different types of folding, consistent with one or more exemplary embodiments of the present disclosure.
Figure 11B:
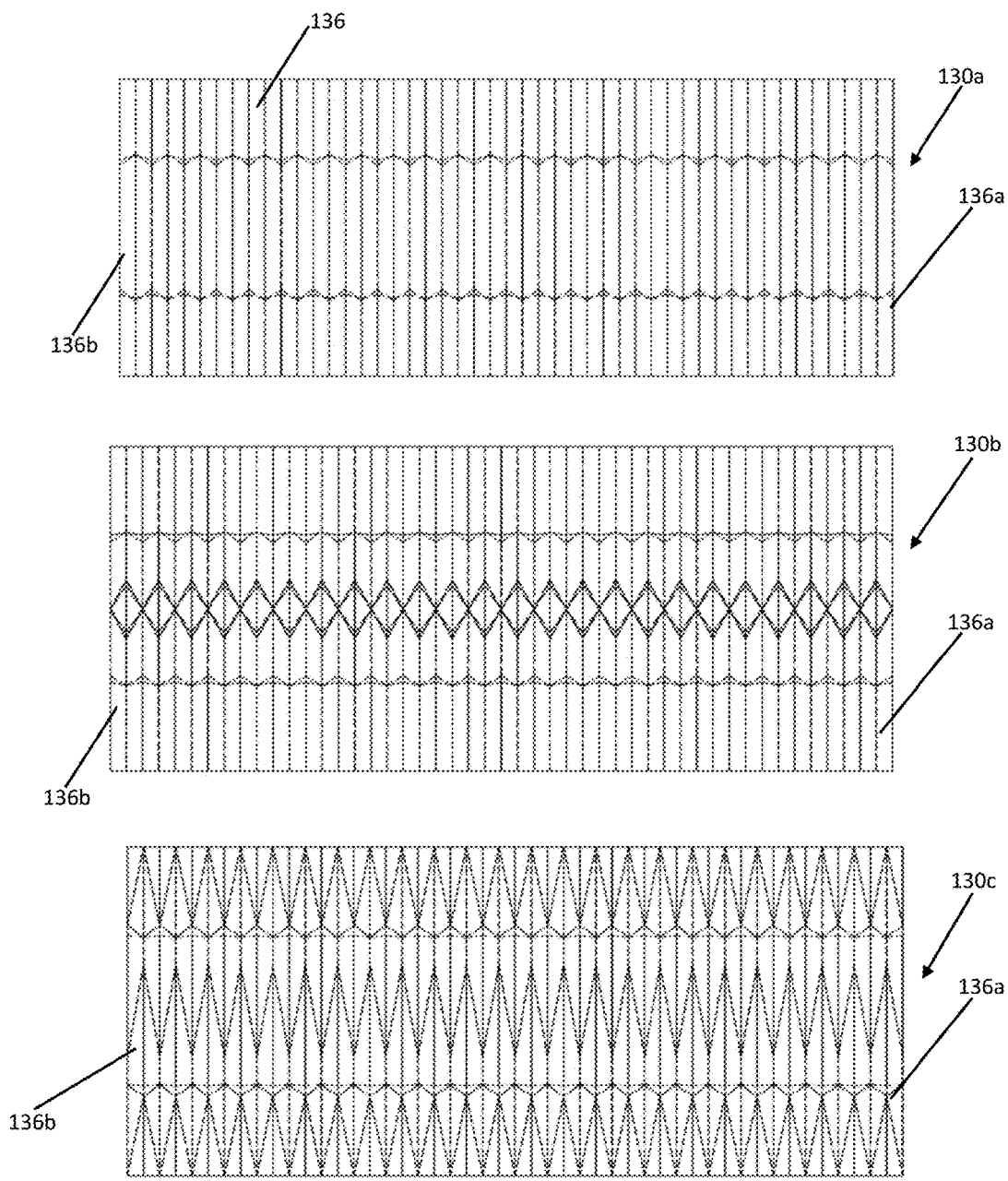
FIG. 11B illustrates three different example implementations of patterns along which an exemplary cover fabric may be folded, consistent with one or more exemplary embodiments of the present disclosure.

Referring to FIGS. 11A and 11B, the cover 130 may have an accordion-pleated shape, which allows for folding and unfolding the cover 130 along a pre-determined pattern 136. FIG. 11A shows three example implementations of the accordion-pleated form of the covers 130 and FIG. 11B also shows the respective patterns of these three example forms of the cover 130. The accordion-pleated form of the cover 130 may include a plurality of adjacent folds 136, wherein the folds 136 may include a first fold 136a and a last fold 136b. The first fold 136a may be symmetrically attached to the surface of the arms 134a and 134b. During the folding of the cover 130, each fold 136 of the cover 130 may lie on the respective adjacent fold 136 to form an accordion-pleated folded shape. The accordion-pleated form of the cover 130 may be unfolded from the folded state or folded from the unfolded state along the axis 131.

Referring to FIG. 9D, the gearbox mechanism 194 may be connected to the proximal ends 139a of the arms 134a or 134b through a connecting rod 194g making a pivotal connecting point 193 allowing the arms 134a or 134b to pivot around the connecting point 193.

Referring to FIGS. 9A and 9B, the gearbox mechanism 194 may include: a fixed cylindrical housing 196, attached to the movable mounting plate 162 providing a fixed base for a rotational movement, a rotatable cylindrical housing 198 rotatably mounted on the fixed cylindrical housing 196 and rotatable thereon coaxially, an input shaft 194a coupled with the geared motor 192 and an output shaft 194b attached to the proximal end 139a of the arms 134a or 134b, a bevel pinion-gear set 200, configured to change the direction of power from the axis 194d to the axis 194e, a solenoid 206 attached to the upper side of the rotatable cylindrical housing 198 and rotatable therewith, and a second flat surface gear 208 attached to the solenoid 206 and placed coaxial with respect to the axis 194d, configured to be engaged with a first flat gear 204b attached to a driver bevel gear 204.

The bevel pinion-gear set 200 may include a driven bevel pinion 202 and the driver bevel gear 204. The driven bevel pinion 202 may be either engaged with the driver bevel gear 204 or a second flat gear 206. The driver bevel gear 204 may be able to move up and down on an intermediate shaft 194f. An intermediate bevel gear set 199 may be located between the input shaft 194a and the intermediate shaft 194f configured for changing the direction of power transmission from the axis 194c to the axis 194d. The intermediate bevel gear set 199 may include a driver bevel pinion 199a and a driven bevel gear 199b. The intermediate bevel gear set 199 may be coupled with the input shaft 194*a* receiving power from the geared motor 192 and sending power to the intermediate shaft 194*f*.

Referring to FIGS. 9A and 9B, the fixed cylindrical housing 196 and the rotatable cylindrical housing 198 may be considered as a housing, providing also a space for placement of the elements of the gearbox mechanism 190. The fixed cylindrical housing 196 may have an opening, which may create a passage for the input shaft 194*a*. The fixed cylindrical housing 196 may be rotatably engaged with the rotatable cylindrical housing 198. The fixed cylindrical housing 196 may be placed coaxial with the rotatable cylindrical housing 198. The rotatable cylindrical housing 198 may be activated by the controller 302 to rotate in the fixed cylindrical housing 196 around the axis 194*d*. The rotatable cylindrical housing 198 may be also provided with an opening to allow the output shaft 194*b* to pass through. The output shaft 194*b* may be connected to the proximal end 139*a* of the respective arms 134*a* or 134*b*.

The driver bevel gear 204 may have a bevel surface with 45-degree geared surface 204*a* and another surface with a flat geared face 204*b*, and may be forced to move up or down on the intermediate shaft 194*f*. In another exemplary implementation the driver bevel gear 204 may have a bevel surface 204*a* and an upper flat surface, wherein the driver bevel gear 204 may be attached to the first flat gear 204*b*. The first flat gear 204*a* may be meshed with the second flat gear 208 in order to allow the rotatable cylindrical housing 198 to rotate on the fixed cylindrical housing 196. The solenoid 206 may be coaxially attached to the rotatable cylindrical housing 196, on which the flat surface gear 208 may be also coaxially mounted. The solenoid 206 may be configured to be activated by the controller 302 to grab the driver bevel gear 204 along the axis 194*d* on the shaft 194*f* or release the driver bevel gear 204 in order to engage or disengage the first flat gear 204*b* with the second flat gear 208. Upon disengagement with the second flat gear 208, the driver bevel gear 204 may be released to move down and be placed on its initial engagement with the driven bevel pinion 202.

Upon taking the movable driver bevel gear 204 up, which may be displaceable up and down on the intermediate shaft 194*f*, the first flat gear 204*b* may be engaged with the second flat gear 208 mounted on the rotatable cylindrical housing 198. In this state the rotatable cylindrical housing 198 may be forced to rotate around the axis 194*d* with the rotation of the second flat gear 208. A spring may be placed on the shaft 194*f* between the solenoid 206 and the driver bevel gear 204, providing the restoring force required for the driver bevel gear 204 to come back to its engagement position with the driven bevel pinion 202 upon releasing by the solenoid 206. The driven pinion bevel 202 is mounted on the output shaft 194*b*, providing the required rotational movements for the respective arms 134*a* or 134*b*.

Referring to FIG. 9C, three successive orientations of the driven bevel pinion 202 and the driver bevel gear 204 inside the gearbox mechanism 194 may cause three successive rotational movements of the arms 134*a* and 134*b*. In step 0, the arms 134*a* and 134*b* may be in the folded state. The initial orientation of the gears inside the gearbox mechanism 194 is shown in step 0. The first rotational movement of the arm 134*a* or 134*b* may be around the axis 103*a*. The power may be received from the geared motor 192 passing through the intermediate gear set 199 into the intermediate shaft 194*f* in order to change the direction of power. The driver bevel gear 204 may rotate accordingly with the rotation of the intermediate shaft 194*f*. The driven bevel pinion 202 may also rotate subsequently in engagement with the driver bevel gear 204, causing the arm 134*a* or 134*b* to rotate therewith. The direction and angle of rotation of the geared motor 192 may be controlled by the control system 308. The angle of rotation of the arms 134*a* or 134*b* in each of three successive steps may be controlled to be 90 degrees. The orientations of the bevel pinion-gear set 200, the output shaft 194*b* and the connecting rod 194*g* are shown in step 1 of FIG. 9C. Moving on to step 2 a rotational movement of the rotatable cylindrical housing 198 on the fixed cylindrical housing 196 may be performed. The orientation of the bevel pinion-gear set 200 and the shafts 194*b* and 194*g* are shown in step 2 of FIG. 9C. The movement of the arms 134*a* or 134*b* may be a rotation around the axis 103*b* in an appropriate direction. In order to be able to perform this rotation, upon receiving the control signal the solenoid 206 may be activated to force the driver bevel gear 204 to move up on the intermediate shaft 194*f*. The first flat gear 204*b* attached to the driver bevel gear 204 may be disengaged from the driven bevel pinion 202 and meshed with the second flat gear 208. Upon activation by the controller 302 the power of the motor 192 from the shaft 194*f* may be received by the driver bevel gear 204 and cause the rotatable cylindrical housing 198 to rotate in an appropriate direction around the axis 194*d*. This movement may lead to the orientation of the output shaft 194*b* shown in step 2 of FIG. 9C. Referring to FIG. 9C, the third rotational movement of the arms 134*a* and 134*b* may be around the axis 103*c*. In this step the control system 308 may force the solenoid 206 to release the driver bevel gear 204. The driver bevel gear 204 may be released to move down on the shaft 194*f*. The spring 209 may exert a restoring force on the driver bevel gear 204 and help the driver bevel gear 204 to be engaged with the driven bevel pinion 202 again. The controller 302 may activate the geared motor 192 to rotate 90 degree in an appropriate direction. The power may be transmitted to the intermediate shaft 194*f* thereafter. Upon the rotation of the driver bevel gear 204, the driven bevel pinion 202 may also rotate 90 degrees causing the output shaft 194*b*, and the arms 134*a* or 134*b* to rotate accordingly. This is shown as step 3 in FIG. 9C.

Figure 10:
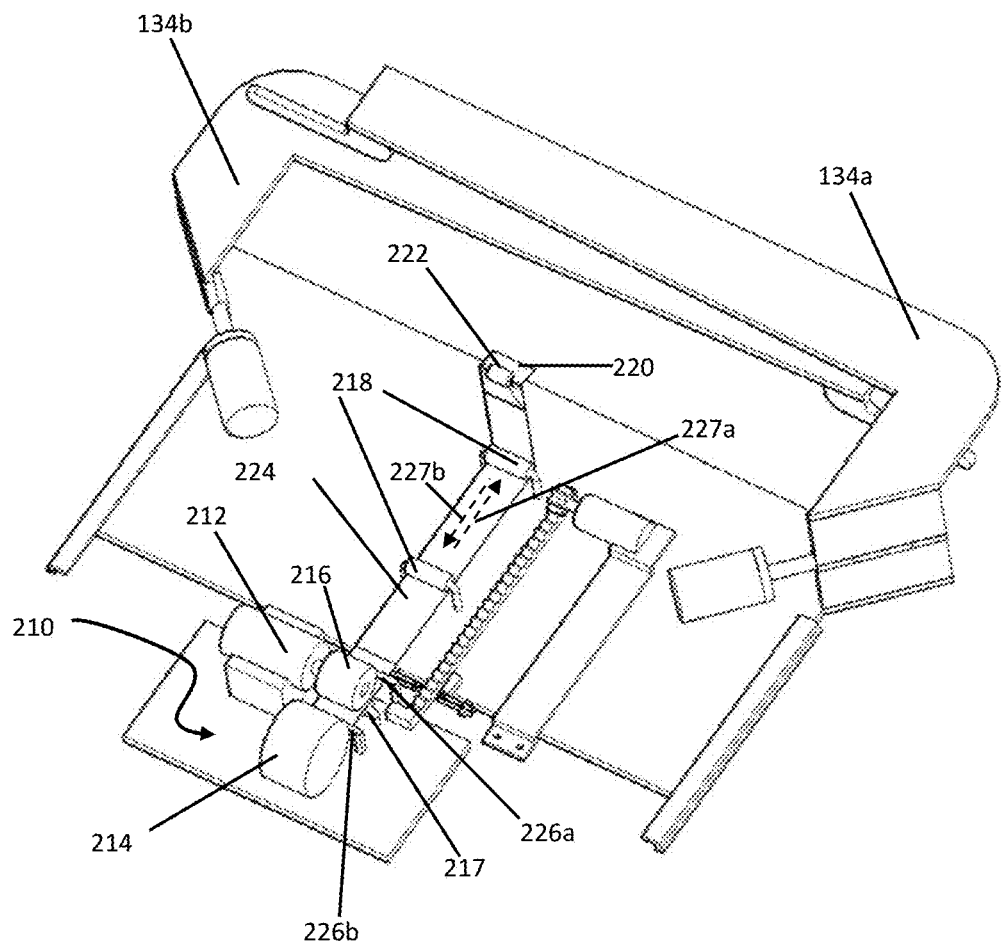
FIG. 10 illustrates an example implementation of a folding mechanism configured to fold or unfold an exemplary cover by opening or rolling up an example implementation of a strip-like member, consistent with one or more exemplary embodiments of the present disclosure.

Referring to FIG. 10, a folding mechanism 210 is configured to fold or unfold the cover 306*d*. The folding mechanism 210 may be considered as an exemplary implementation of the folding mechanism of FIG. 2. The folding mechanism 210 may include: a geared motor 212, providing the required power for unfolding or folding of the cover 306*d*, which may be mounted on a place at the bottom of the vehicle 100 or in an enclosure other than enclosure 106, a thin flat strip-like member 224, for example, a strip-like spring attached to the front side of the cover 306*d* through a holder set 244 from one end, passing through a passage on a lower surface of the cover 228*a* and placed inside of a cylindrical container 214 from another end, the cylindrical container 214 configured for providing the required space for rolling the strip-like member 224, a rubber coated roller wheel 216 coupled with the output of the geared motor 212 and rotatable therewith, making a frictional contact with the strip-like member 224 forcing the strip-like member 224 to be rolled or unrolled, a plurality of rollers 218 mounted along the path of the strip-like member 224 providing the required guiding means for the strip-like member 224 through which the strip-like member 224 may be displaced smoothly without being wrinkled, two sensors 226*a* and 226*b*, locating before and after the rubber coated roller wheel 216, regulating the movements of the strip-like member 224 and informing the controller 302 of the beginning and finishing the unfolding or folding processes. The strip-like member 224 may pass through the path between the roller wheel 216 and a roller 217 and move inward the container 214 or outward of the container 214. The rollers 217 may be mounted under the strip-like member 224 in front of the roller wheel 216, in order to facilitate the movements of the strip-like member 224. The strip-like member 224 may be rolled in or out of the container 214. The rolling out process of the strip-like member 224 may cause the cover 306d to unfold, taking place in the opening process 400 of the covering system 300. The rolling in process of the strip-like member 224 may cause the cover 306d to fold, taking place in the closing process 400 of the covering system 300.

Figure 12A:
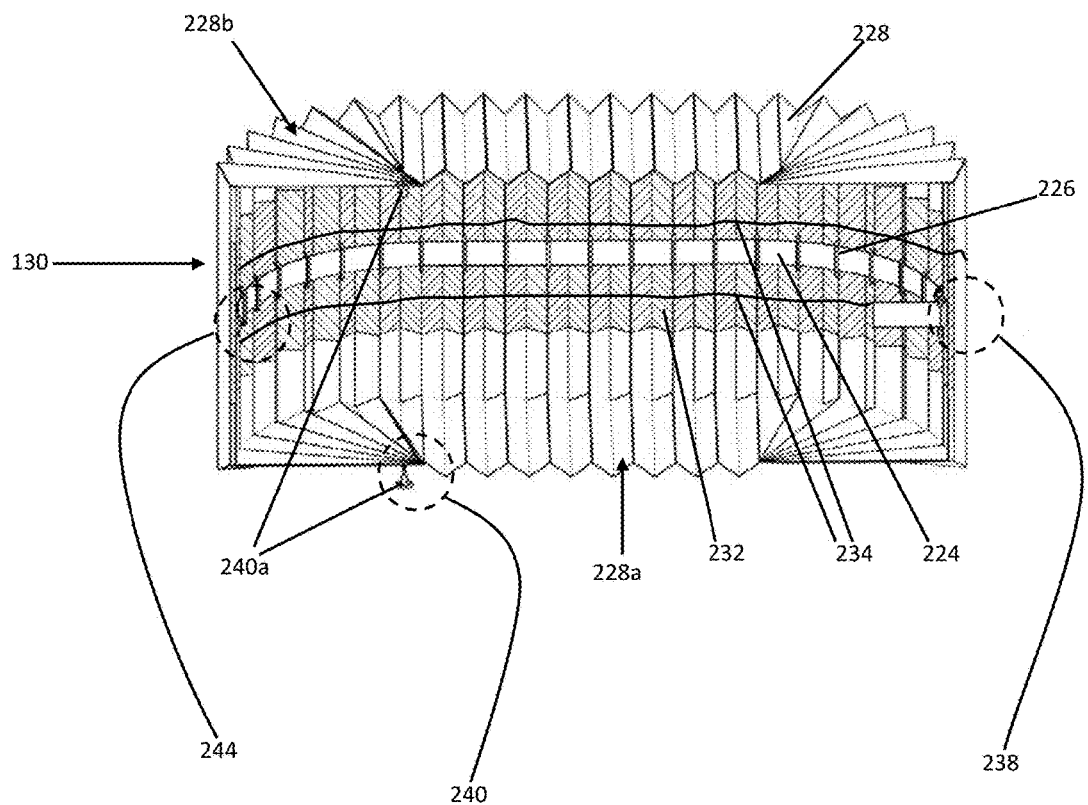
FIG. 12A illustrates an example implementation of an exemplary accordion-pleated cover consistent with one or more exemplary embodiments of the present disclosure.

Referring to FIGS. 10 and 12A, the strip-like member 224 may be configured to be forced by the control system 308 to displace the cover 306d during the opening process 400 or the closing process 500. The cover 306d may be unfolded from the initial folded position through the outward displacement of the strip-like member 224 form the container 214. The movement of the strip-like member 224 towards the container 214 may cause the cover 306d to be folded from the opened position. The movements of the strip-like member 224 may be either rolling in the container 214 in the closing process 500 or rolling out of the container 214 in the opening process. As the strip-like member 224 may be attached to the end of the last fold 136b of the cover 306d, the cover may be carried with the displacement of the strip-like member 224.

Referring to FIG. 10, the geared motor 212 may be configured to rotate in relevant direction upon receiving an activation signal from the controller 302. The rubber coated roller wheel 216 coupled with the geared motor 212 may rotate as well, exerting the required force on the strip-like member 224, causing the strip-like member 224 to be taken out of the container 214. The movement of the strip-like member 224 may be directed along the arrow 227a in unfolding of the cover 306d or arrow 227b shown in FIG. 10. The strip-like member 224 may be rolled out of the container 214 as long as the contact between the roller wheel 216 and the strip-like member 224 exists and the motor 212 is making the power under the control of the controller 302. The unrolling of the strip-like member 224 out of the container 214 may cause the cover 306d to take the unfolding process. Passing through the roller wheel 216, the rollers 217 and the sensors 227a and 227b, the spring-like strip 224 may pass beneath the cover 306d through the passage created by the transversal cords 226 and displace the cover 306d frontwards.

Referring to FIGS. 11A and 11B, the cover 306d may have an accordion-pleated shape, which allows for folding and unfolding the cover 306d along a pre-determined pattern 136. FIG. 11A shows three example implementations of the accordion-pleated form of the covers 306d and FIG. 11B also shows the respective patterns of these three example forms of the cover 306d. The accordion-pleated shape of the cover 306d may include a plurality of adjacent folds 136, wherein the folds 136 may include a first fold 136a and a last fold 136b. The first fold 136a may be configured to be symmetrically attached to the surface of the arms 134a and 134b. During the folding of the cover 306d, each fold 136 of the cover 306d may lie on the respective adjacent fold 136 to form an accordion-pleated folded shape. The accordion-pleated form of the cover 306d may be unfolded from the folded state or folded from the unfolded state along the axis 131.

Referring to FIG. 11A, the covers 306d may have either a simple accordion-pleated form of folding 130a or different inclined accordion-pleated form of folding such as the forms shown as 130b and 130c illustrating three example implementations. The inclined forms 130b and 130c may allow the rain water not to stay on the cover 306d compared with the form 130a. In case of rain, the slope existed in the folding patterns 130b and 130c may cause the rain water to pour out due to the dip or inclination caused by the type of the folds. The cover 306d may be made of a fabrics 228 for the vehicle's covers and the fabric 228 may be impregnated by some type of resin that improves the folding capability of the cover and its regular opening and closing functionality without wrinkling of the folds 136.

Referring to FIG. 12A, the cover fabric 228 may be made of a type of material for covers having some specific properties. The fabric 228 may be selected so as to have properties like sunlight reflection, waterproofing, foldability, anti-heat, etc., wherein a kind of resin may be used as a stiffener material. The resin material can make the cover fabric 228 stiffer and improves the folding capacity of the fabric 228.

Referring to FIG. 12A, the cover 306d may include: a cover fabric 228, having a front side, a rear side, a lower surface 228a and an upper surface 228b, which may be configured to serve as the main sheet on which a specific pattern of folding may be implemented, a plurality of flexible transversal cords 226 which may be configured to serve as supporting strings, attached to the lower surface of the cover fabric 228a transversely providing a supported passage 135 for the thin spring-like strip 224 to pass through and carry the cover 306d in the opening process or the closing process 500, at least two longitudinal flexible cords 234, attached to the projections caused by the adjacent folds 136 along the longitudinal line of the cover 306d to the lower surface of the cover 228a and parallel to the flat strip-like member 224 on both sides of the flat strip-like member 224 for improving the longitudinal strength of the cover 306d and preventing its longitudinal wrinkling, allowing the folds 136 to lie on or part from each other during the opening or closing processes 500. The transversal cords 226 and the longitudinal cords 234 may be made of flexible materials and may be mounted on the lower surface of the cover 228a.

In addition some accessories may be included in order to facilitate the functionality of the cover 306d. Although the cover 306d may be operational without using the accessories, using them may boost the functionality of the cover 306d. For example, a thin sheet 232, made of a material like plastic, may be attached to the lower surface of the cover fabric 228a having the rectangular shape. This plastic sheet 232 may increase the stiffness of the lower surface of the cover fabric 228a. Also a spring-like wire 236 which may be mounted within the front face of the last fold 136b with a very small diameter, to aid in retaining the shape of the cover 306d and to facilitate the opening 400 and closing 500 processes of the cover 306d as well as preventing the cover 306d from being wrinkled. Two blocks 238, with flat shapes and heavy weights, may be mounted on both front faces of the last fold 136b. In some steps of the opening process 400, the blocks 238 may facilitate the opening process 400 without wrinkling and move appropriately on the vehicle 100, in addition to making the front of the cover 306d heavy and preventing the lifting of the cover 306d in case of severe wind. Also in some steps of the closing process 500, blocks 238 may help correct the direction and placement of the holding clamps 240 on the appendages of the arm 242a and 242b. At least two movable guiding devices 240 may facilitate the carrying of the cover 306*d* during the opening 400 or closing 500 processes.

The thin plastic sheet 232 may be utilized to enhance the cover strength and durability besides improving the foldability of the cover 306*d*. The transversal cords 226 may be made of cotton and additional materials with similar properties as cotton having the flexibility and other properties. The transversal cords 226 may be attached to the projections by the adjacent folds 136 at regular distances at the lower surface of the cover fabric 228*a*. The transversal cords 226 may provide a passage for the thin flat spring-like strip 224 to pass through and enhance the opening 400 and closing 500 processes of the cover 306*d* and prevent disorganization of the folds 136 and wrinkling.

Figure 12B:
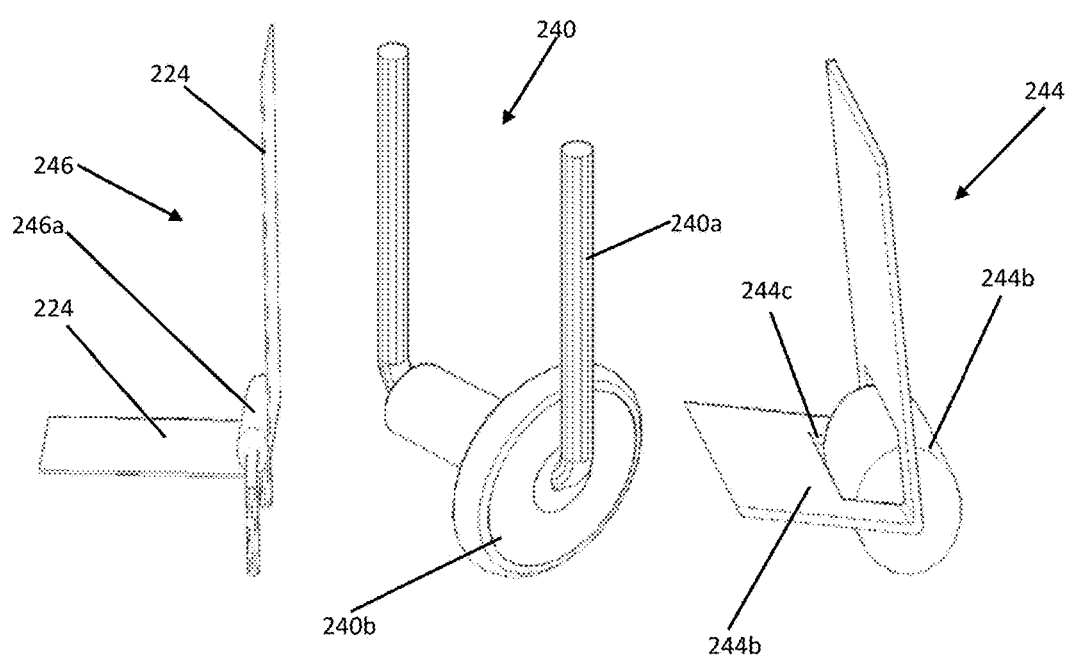
FIG. 12B illustrates schematic views of three example implementations of accessories associated with an exemplary accordion-pleated cover, consistent with one or more exemplary embodiments of the present disclosure.

Referring to FIG. 12B, at least two movable guiding devices 240 may be used to hold the cover 306*d* at a correct level and facilitate the movement of the cover 306*d* thereafter, during the opening 400 and closing 500 processes. An example implementation of the movable guiding devices is shown in FIG. 12B. Each of the movable guiding devices 236, which may be mounted on the lower inside side of the last fold 136*b*, may include a wheel 240*b* and a clamp 240*a*. The wheel may be rolled on the ground in the opening 400 or closing 500 processes. The roller wheels 236*b* along with the clamps 240*a* may be configured to hold and facilitate the movement of the cover 306*d*. Also the roller wheels 240*b* may be used to guide the cover 306*d* to be correctly placed on the appendages 242*a* and 242*b* of the arms 134*a* and 134*b* when the cover 306*d* is the closing process 500. The roller wheels 240*b* may be placed on the appendages of the arms 242*a* and 242*b*, at the final step of the folding process of the cover 306*d*.

FIG. 12B also shows an exemplary implementation of a holder set 244, which may be configured to provide the required means for connecting the strip-like member 224 to the front side of the lower surface of the cover fabric 228. Referring to FIG. 12B, the holder set 244 may include an L-shaped holder 244*a* having a slot 244*c* in the bending junction line of the L-shaped holder 244*a*, and a rubber-coated roller wheel 244*b*, mounted on the slot 244*c*. The holder set 244 may be mounted at the front side of the lower surface 228*a* the cover 306*d* through attaching the L-shaped holder 244*a* to the cover 306*d*, and configured to facilitate the attachment of the strip-like member 224 thereon. The roller wheel 244*b* attached to the L-shaped holder 244*a* may facilitate the smooth movement of the strip-like member 224 and hence, the folding or unfolding of the cover 306*d* over the outer surface of the vehicle 100. Roller wheel 244*b* may be in contact with the surface of the vehicle 100 during the opening 400 or closing 500 processes. Therefore, roller wheel 244*b* it may also prevent the cover 306*d* from putting scratch marks on the body of the vehicle 100.

Referring to FIG. 12A, the strip-like member 224, which may be coated with a layer of protecting material like rubber, may be actuated in the folding mechanism 210 by the control system 308 to cause the cover 306*d* to undertake the folding or unfolding processes. Passing through the passage made by the flexible transversal cords 226, the strip-like member 224 may carry the cover 306*d* during the opening process 400 towards the front side of the vehicle 100 or during the closing process 500 towards the back side of the vehicle 100.

Referring to FIGS. 12A and 12B, a roller 246*a* may be mounted on the line along which the strip-like member 224 may be bent in order to change its direction from the container 214 to the final position. The strip-like member 224 may be rolled out of the container 214 horizontally, and makes its way towards the location at the front side of the vehicle 100. Therefore, it may need to change its direction in a place wherein the roller 246*a* may be mounted. This roller 246*a* may be mounted parallel to the rollers 218 and 217 shown in FIG. 10, facilitating the inward or outward displacements of the strip-like member 224 to be smooth and without wrinkling.

Figure 13:
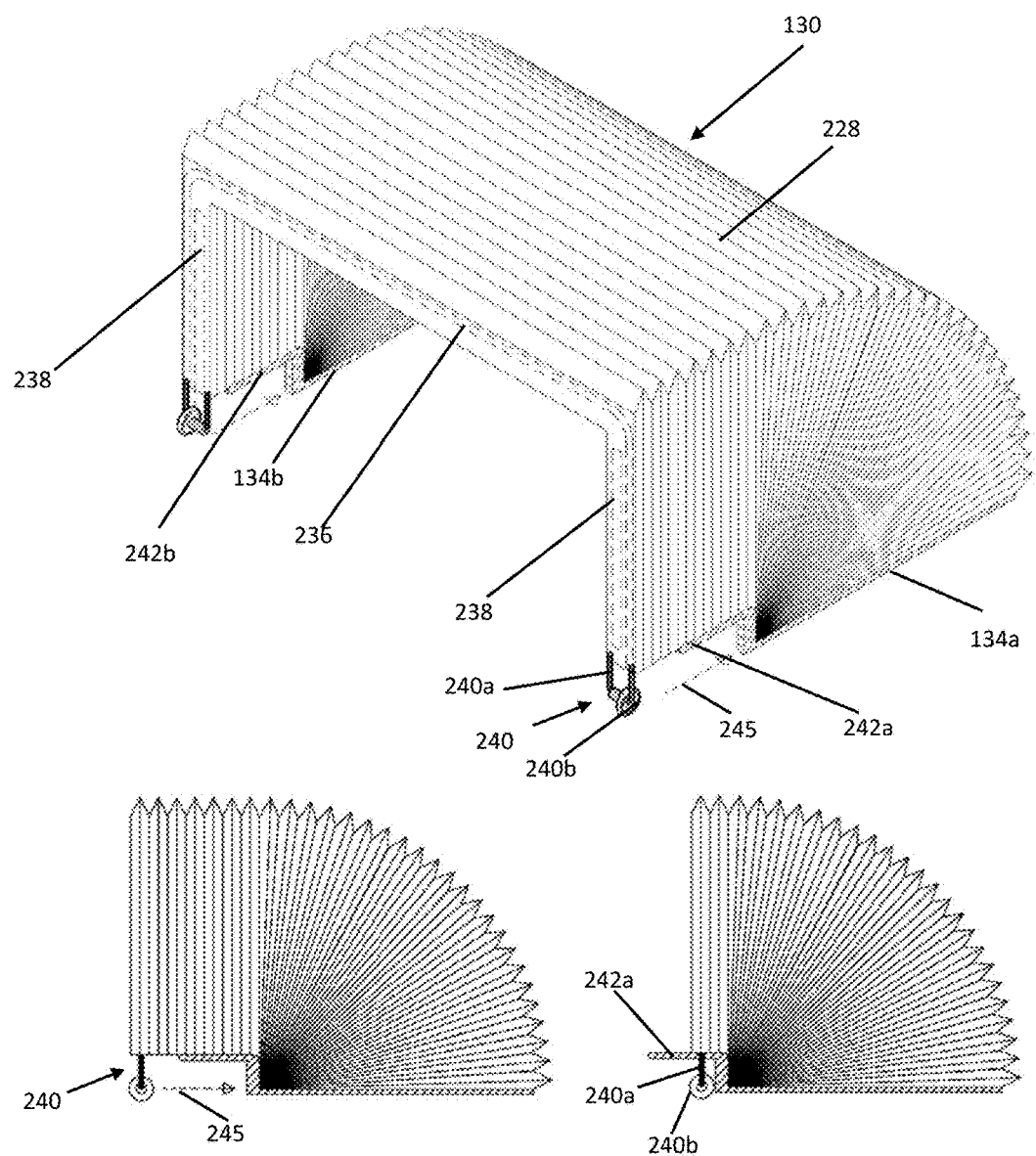
FIG. 13 illustrates a perspective view of an example implementation of a cover in a state of an exemplary closing process along with two schematic views of the cover in two different steps of the exemplary closing process.

Referring to FIGS. 12A and 13, the spring-like wire 236 may be attached to an outer face of the last fold 136*b*, which allow the cover 306*d* to appropriately open or close. Also, the spring-like wire 236 may help prevent the transverse wrinkling of the folds. Two blocks 238 may be mounted at either sides of the last fold 136*b*, in order to prevent the cover 306*d* from being displaced due to the outside effects. Also at least two sets of the roller wheels 240*b* may be placed on a holding clamp 240*a*, which may allow the cover 306*d* to properly move. The arrow 245 shows the direction of movement of the wheel 240*b* and the displacement of the cover 306*d* in the closing process 500. When the wheel 240*b* reaches the respective arm 242*b*. This placement may cause the wheels 240*b* to be disconnected from the ground and prevent the displacing of the wheels 240*b* on the ground in this stage, making the cover 306*d* and the arms 134*a* and 134*b* in the opened state ready to be closed to the folded position.

Figure 14:
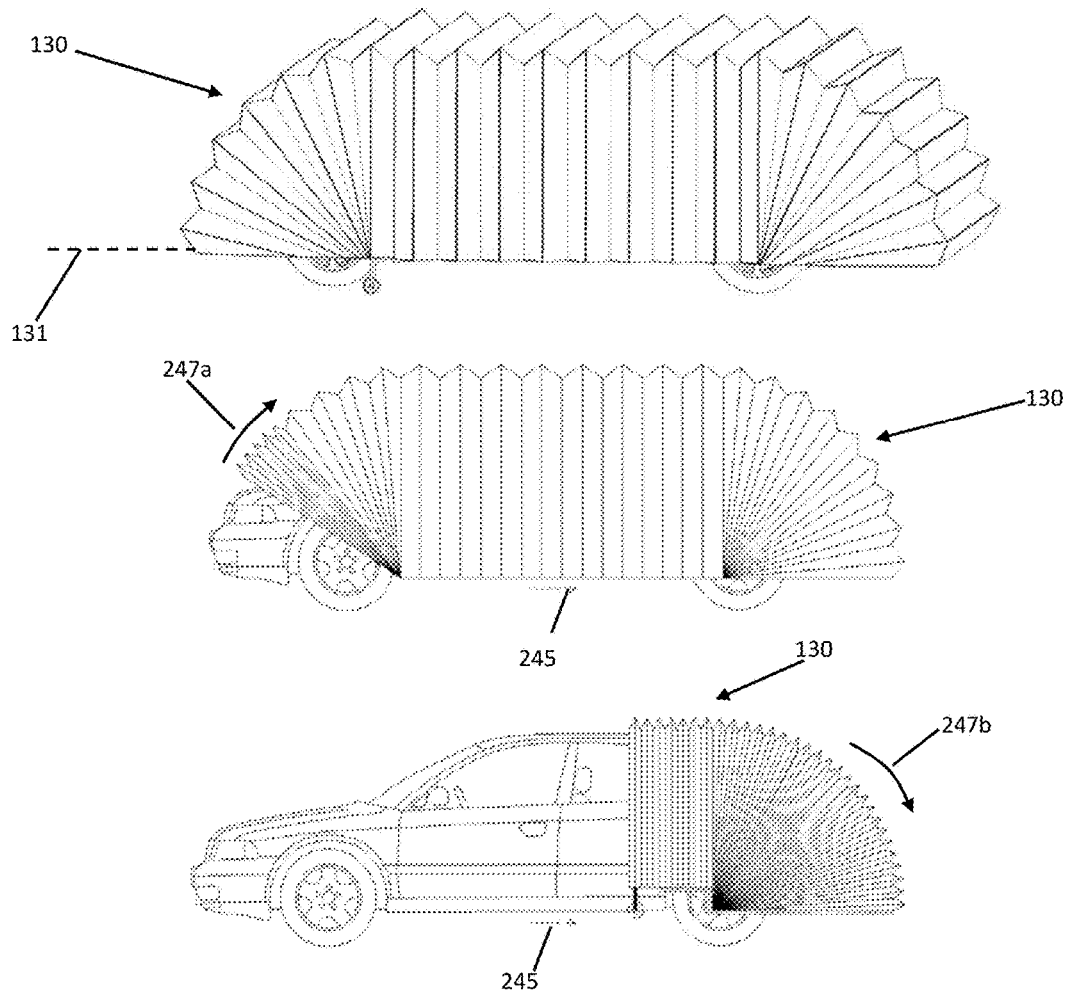
FIG. 14 illustrates different views of an exemplary closing process of a cover, consistent with one or more exemplary embodiments of the present disclosure.

Referring to FIG. 14, as the cover 306*d* fully unfolds, shown in the first figure, and wraps the entire surface of the vehicle 100, movement of the cover 306*d* may be stopped by the controller 302. Movement of the cover 306*d* in the opening process 400 may occur due to the outward movement of the strip-like member 224 from the container 214 from the backside of the vehicle 100 to the front side of the vehicle 100. Once, cover 306*d* is fully open, the control system 308 may cause the speaker 114 to stop playing the alarm and the vehicle's flashers 108 to be turned off. The control system 308 may be hold in the standby mode, waiting for the next operation to be summoned. It may be possible for user to trigger the cover 306*d* to be rolled up by applying the respective command of closing the cover 306*d* through the remote control 301.

Referring to FIG. 14, upon receiving the control command for folding of the cover 306*d* from the remote control 301, the controller 302 may utilize the distance sensors 122 to determine if the required distance of the rear bumper 102 from the sides are in the allowable range for folding of cover 306*d*. Right after receiving the respective authorizing command, the flashers 108 may be turned on and a warning alarm may be played through the speaker 114. The procedures which may have been performed in order to get open the cover 306*d*, may be carried out in a successive reverse order of steps as compared to the opening steps. The control system 308 may activate the folding mechanism 210 to actuate the strip-like member 224 to be rolled up. The motor 212 may be forced to rotate in a reverse direction compared with the unfolding process causing the roller wheel 216 to rotate therewith in a reverse direction compared with the opening process 400. The strip-like member 224 may be forced to displace along the arrow 227*b*, shown in FIG. 10, passing through the sensor 226*a* and a plurality of the rollers 218, before making the way towards the path through the roller wheel 216 and the beneath roller 217, in order to be rolled up in the container 214.

Figure 15A:
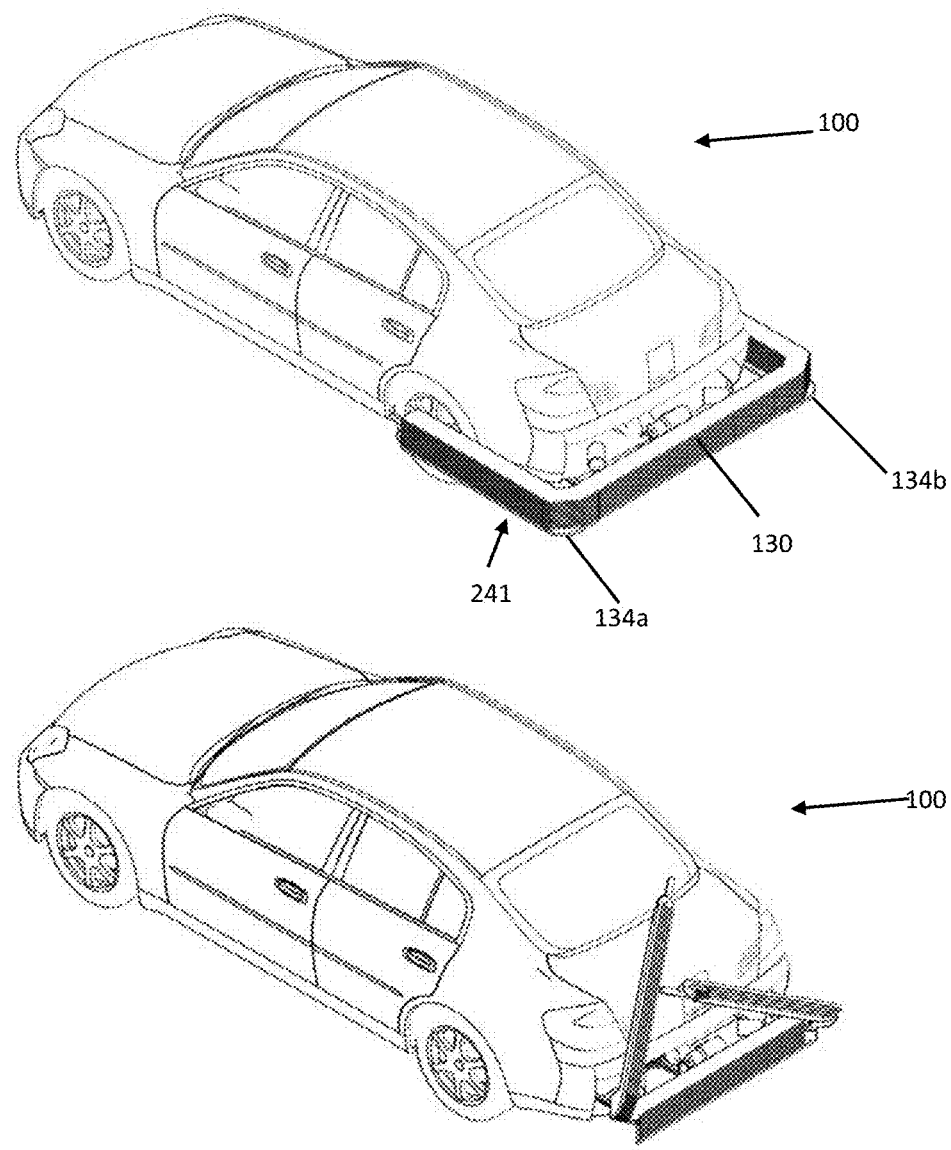
FIG. 15A illustrates two schematic views of two different positions of arms during an exemplary closing process of cover in vehicles with a specific trunk section, consistent with one or more exemplary embodiments of the present disclosure.

Referring to FIGS. 10, 14 and 15A, as a result of displacement of the strip-like member 224 along the arrow 227*b*, the cover 306*d* may be displaced along the arrow 240*c*. The cover 306*d* may begin to uncover the outer surface of the vehicle 100 smoothly and continuously, shown in the second figure of FIG. 14. The wheels 240*b* may be forced to displace the direction of the arrow 245 till reaching the respective appendage 242a or 242b. In this state the wheels 240b may be placed on the appendages 242a or 242b in order to facilitate the closing of the arms 134a and 134b, thereafter. The cover 306d may displace along a path, which may be nonlinear in portions shown by 247a and 247b and linear in another portion 245 between two nonlinear portions 247a and 247a. The arrow 245 also shows the direction of the entire path of the wheel 240b. During the folding process, the cover 306d may displace along this arrow. The folding of the cover 306d may be performed utilizing curved paths, the nonlinear sections of the path are illustrated by 247a and 247b, when displacing over the front and rear sections of the vehicle 100. Passing over the intermediate section of the vehicle 100 may be also performed in the linear path 245. After going past regions referenced as 247a, 245 and 247b, the cover 306d may take the folded position placed on the arms 134a and 134b in their opened states taking the U-shaped form shown by 241 in FIG. 15A.

Figure 15B:
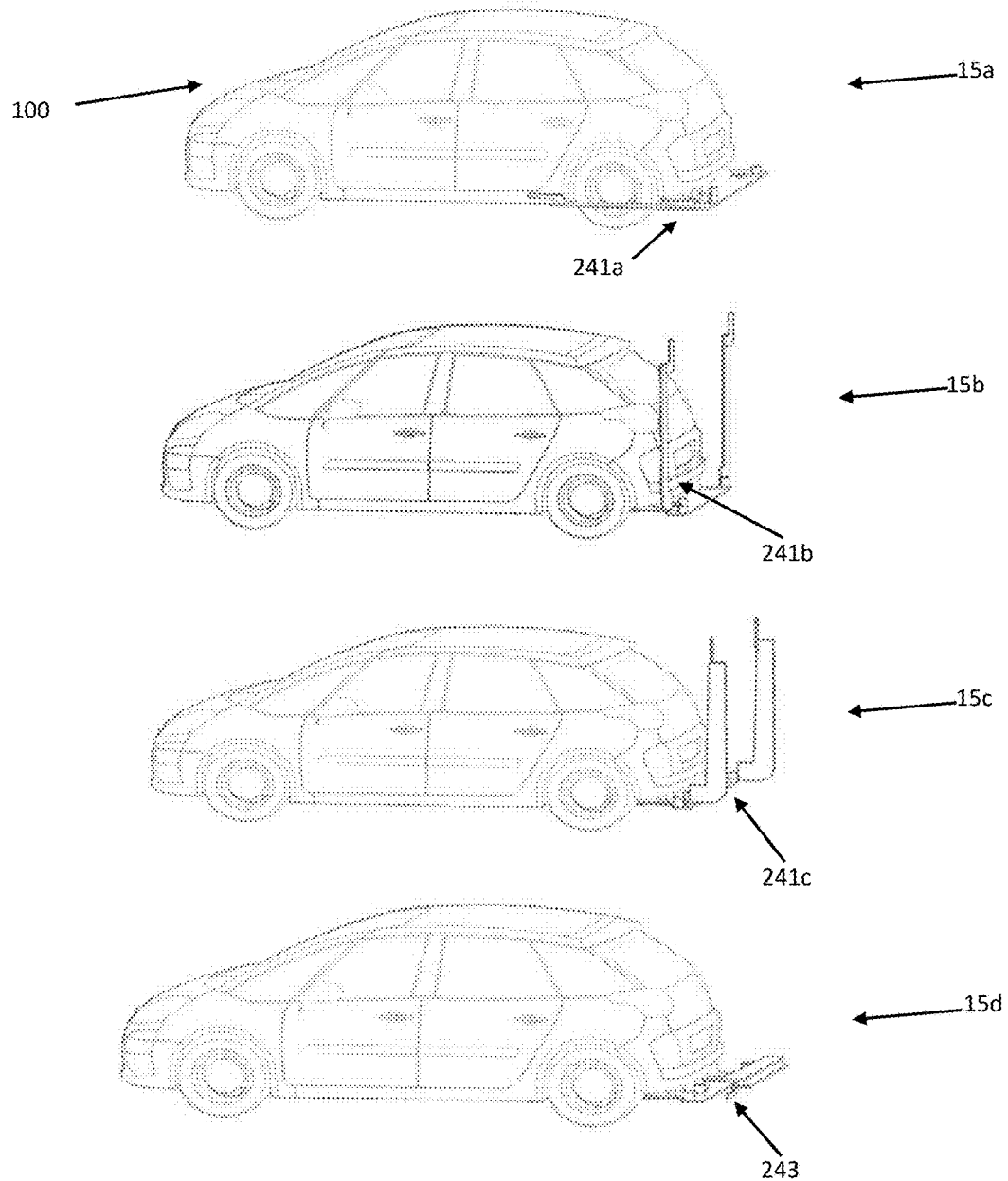
FIG. 15B illustrates schematic views of different positions of the arms during the closing process of the cover in vehicles without a specific trunk section, consistent with one or more exemplary embodiments of the present disclosure.
Figure 16:
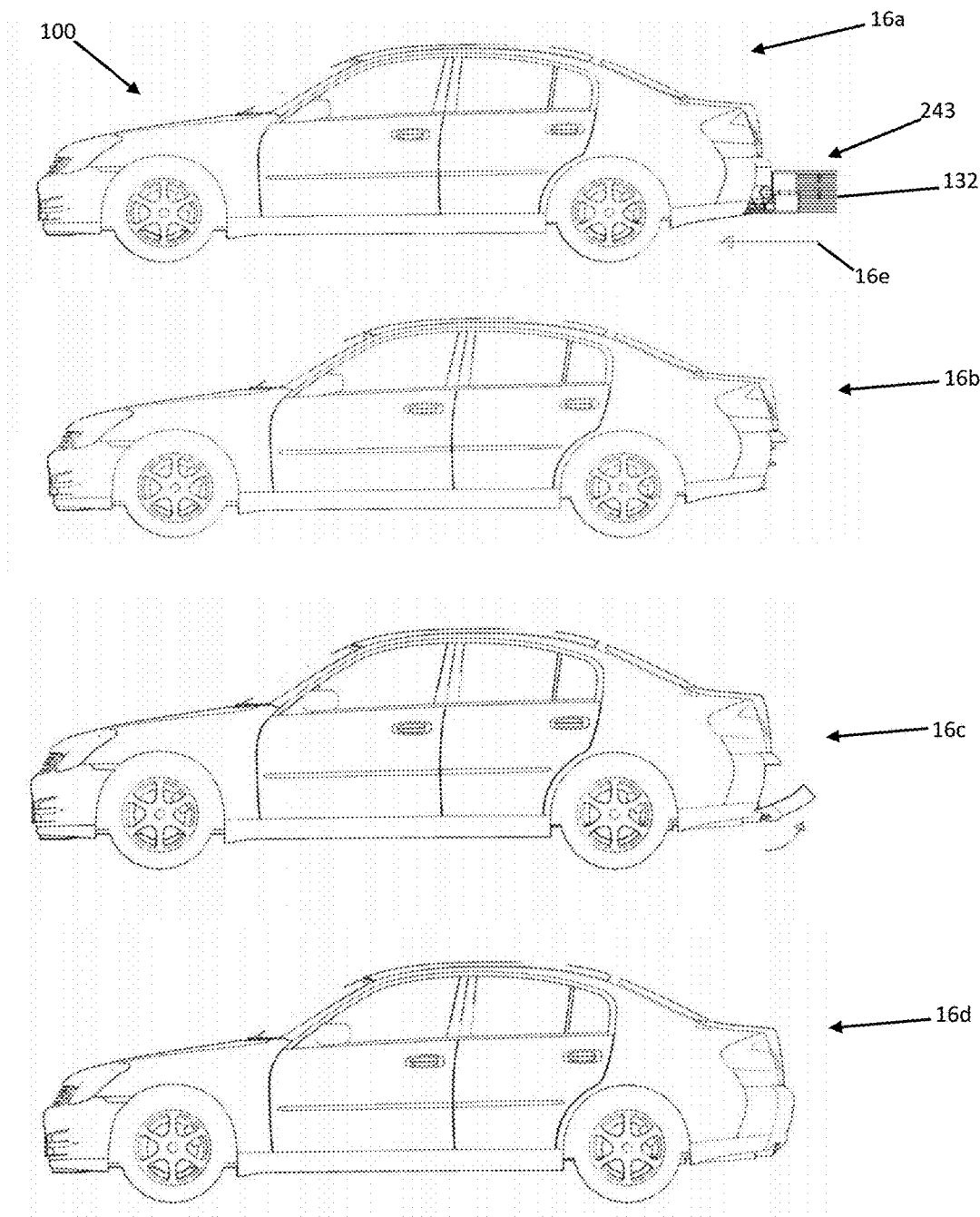
FIG. 16 illustrates schematic views of four steps of an exemplary closing process from a position of exemplary closed arms to final locking of an exemplary movable wall of a rear bumper, consistent with one or more exemplary embodiments of the present disclosure.
Figure 17A:
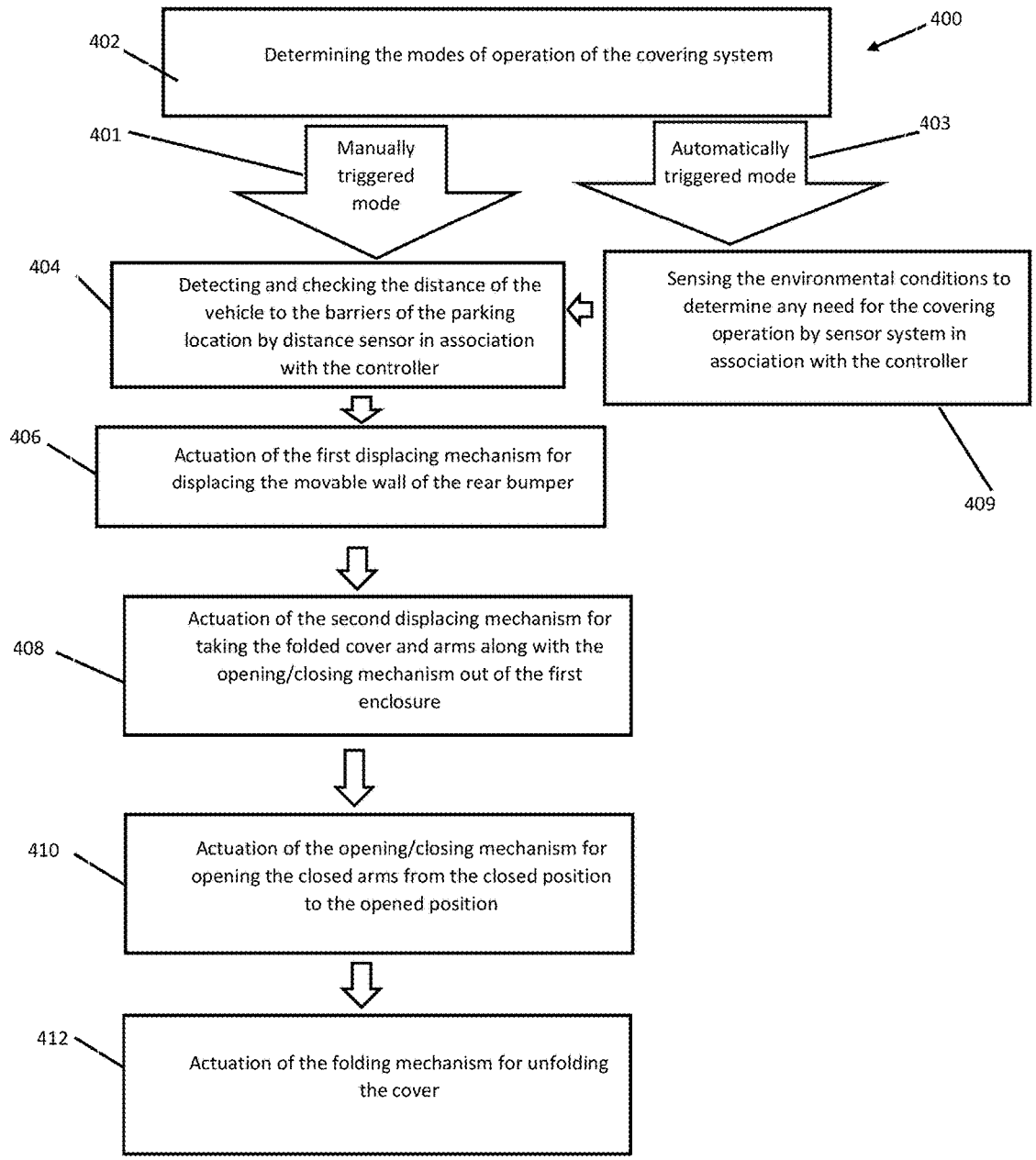
FIG. 17A illustrates a schematic flowchart of an exemplary opening process of an exemplary covering system, according to one or more aspects of the present disclosure.
Figure 17B:
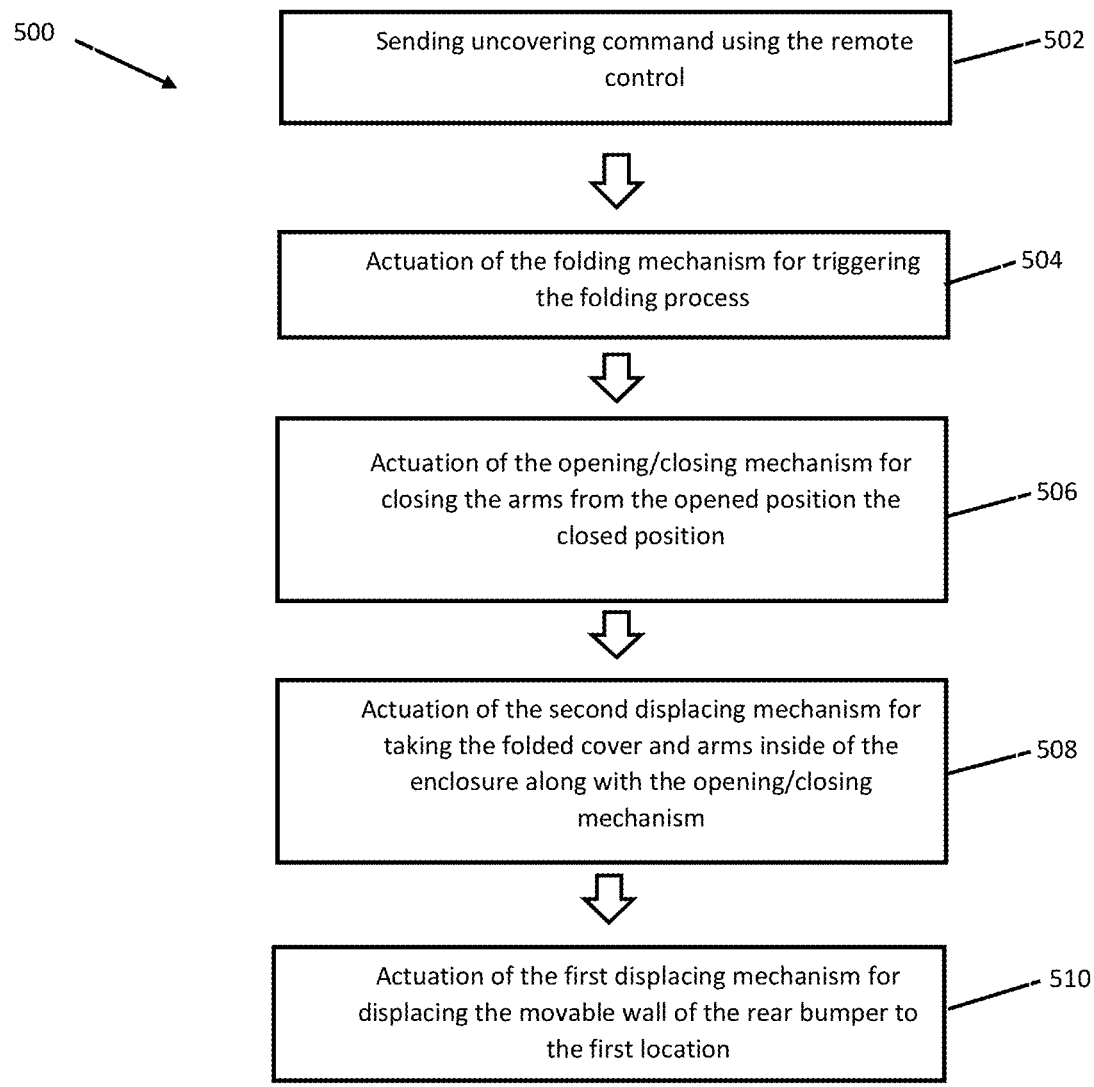
FIG. 17B illustrates a schematic flowchart of an exemplary closing process of an exemplary covering system, according to one or more aspects of the present disclosure.

Referring to FIGS. 15A and 16, after the cover 306d folds and the wheels 240b are placed on the respective appendages 242a and 242b as shown in the first illustration of FIG. 15A, the arms 134a and 134b may undergo the closing operation as shown in the second illustration of FIG. 15A and first of the FIG. 15B. The closing of the arms 134a and 134b may be performed from the opened state to the closed state in a set of one or three successive pivotally rotational movements. Thereafter, the cover 306d and the arms 134a and 134b may take the closed shape as shown in FIG. 15B as the state 15d and in FIG. 16 as the state 243. In the vehicles 100 having a trunk 104, i.e. sedan-type vehicles, the closing process 500 of the arms 134a and 134b from either sides of the vehicle 100, in the U-shaped position along with the cover 100 shown in first illustration of FIG. 15A, to the position 243 of FIG. 16, parallel to the rear bumper 102 and the ground, may include a rotational movement of the arms 134a and 134b around the respective pivot line 181a or 181b making from the connecting line of the arms 134a and 134b to the opening/closing mechanism 303c shown in FIG. 6. This rotational movement may be performed in the same way as the opening process 400 but in a reverse a reverse direction of rotation compared with the arrows 183a or 183b of the opening process 400 shown in FIG. 6.

Referring to FIGS. 6A and 8A, the opening/closing mechanism 303c may be responsible for rotationally displacing the arms 134a and 134b, in sedan types of the vehicles 100A. First the control system 308 may force the motor 184a or 184b to rotate and cause the arms 134a and 134Bb to rotate accordingly. Rotating in an opposite direction to the rotation of the opening process 400, shown as arrow 183a or 183b, the motor 184a or 184b may force the central axis 189a or 189b of the hinge 188a or 188b to rotate accordingly. Thereafter the upper leaf 195a or 195b also may rotate and cause the arms 134a or 134b to rotate accordingly. The sensors 186a and 186b for sensing the rotation movements may regulate the allowable amount of the rotational movement of the arms 134a and 134b, through controlling the rotation of the motor 184A and 184B.

Referring to FIG. 15B, for the vehicles 100 without a specific trunk section 104, the closing of the arms 134a and 134b from their positions on either sides of the vehicle 100, to the position, shown in FIG. 16 as 243, parallel to the rear bumper 102 and the ground, may include three successive rotational movements. The coordinate system are the same as the coordinate system defined in FIG. 7B. The arms 134a and 134b may rotate about the axes 103c, 103b, 103a respectively (the reverse sequence compared with the opening process 400) passing through the origin marked as 103o. The origin 103o may be the pivotal connecting point 193 of the arms 134a and 134b with the output shaft 194b of the gearbox mechanism 194 shown in FIG. 9B (connecting point of the rod 194g to the shaft 194b shown as 193 which exist for each of the arms 134a and 134b). The direction of the rotations in the closing process 500 may be opposite to the directions in the opening process 400 shown in FIG. 7B as 103d, 103e and 103f. In the step 15a, the arms 134a or 134b in the opened state may rotate around the respective axis 103c or 103c' in the directions opposite to the directions shown by arrows 103f. The arms 134a and 134b may displace from their initial positions on either sides of the vehicle 100b to the positions parallel to the axes 103a or 103a'. Then in the step 15b the rotations may be around the axes 103b and 103a and in the opposite directions compared with the directions of the 103e and 103d arrows for the arm 134a, and around the axes 103b' and 103a' and in the opposite directions to the 103e' and 103d' for the arm 134b. Each of these steps are shown as 15a, 15b, 15c and 15d states successively in FIG. 15B. The orientation of the arms 134a and 134b in each step are marked as 241a in the state 15a, 241b in the state 15b, 241c in the state 15c and 243 in the step 15d. After undergoing these successive rotational movements, the arms 134a and 134b may be located in the folded form parallel to the back of the rear bumper 102 ready to be taken inside of the enclosure 106.

Referring to FIGS. 9B and 9D, the motor 192 may be triggered by the controller 302 to rotate in an opposite direction compared with the opening process 400 and the gearbox mechanism 194 may be forced to deliver the required rotation accordingly. The three rotational movements may be performed through the direction changes of the power transmission. In each rotation of the gearbox mechanism 194, the arms 134a or 134b may also rotate in order to reach the final position.

Referring to FIG. 16, after folding the cover 306d and closing the arms 134a and 134b, the folded cover and arms 306b may be placed parallel to the rear bumper 102 and the ground in the position 243 shown in FIG. 16. Right after, the folded cover and arms 306b may be forced to come inside of the enclosure 106. The moveable wall of the rear bumper 306a may be remained still open under the bottom 128 of the vehicle 100. The control system 308 may activate the second actuating mechanism 160 to take the folded cover and arms 306b in the enclosure 106, which may be performed along the arrow 16e. In the step 16a, the folded cover and arms 306b may be placed parallel to the rear bumper 102 and the ground. In the step 16b the folded cover and arms 306b may be taken inside the enclosure 106 but the rear bumper 102 is remained open.

Referring to FIGS. 16 and 6A, the second actuating mechanism 160 may be activated in a reverse sequence compared with the taking out process. It means that the controller 302 may activate the motor 166 to rotate in a reverse direction. Then the rotational movement of the motor 166 may be converted to the linear movement by the converting mechanism 167 in a reverse direction compared with the taking in process. Then the movable mounting plate 162 may be linearly taken in the enclosure 106 as a result of receiving the linear movement from the converting mechanism 167. In one example implementation, the converting mechanism 167 may include the pinion 170 and the rack gear 168. The pinion 170 may be rotatably coupled with the motor 166, causing the rack gear 168, which may be meshed with the pinion 170 and attached to the movable mounting plate 162, to be linearly displaced inwards. The arms 134a and 134b may be attached to the opening/closing mechanism 303c or 190 and the opening/closing mechanism 303c or 190 may be also mounted on the movable mounting plate 162. The linear inward movement of the movable mounting plate 162 may cause the folded cover and arms 306b to be taken in the enclosure 106. The opening/closing mechanism 303c or 190 may be also taken inside. The sequence of this operation may be controlled by the control system 308. The sensor 172b may sense the movement of the movable mounting plate 162 and regulate the end of the operation in association with the control system 308. When the folded cover and arms 306b is placed fully inside the enclosure 106, the sensor 172b may inform the control system 308 to take the relevant next control operation.

Referring to FIGS. 16 and 5, after taking the folded cover and arms 306b in the enclosure 106, the first displacing mechanism 303a may be activated by the controller 302 to displace the moveable wall of the rear bumper 306a to its initial place on the rear bumper 102. The positions marked as 16c and 16d in FIG. 16 are related to the movements of the moveable wall of the rear bumper 306a. The control system 308 may activate the rotary actuator 142 to rotate in an opposite direction to the direction of the opening process 400, causing the converting mechanism 144 to convert the rotational movement of the motor 142a to the linear movement of the intermediate link 146. The converting mechanism 144 may include the threaded rod 144a and the nut 144b in one example implementation or a ball screw assembly in another example implementation. The converting mechanism 144 may force the intermediate link 146 to move in a reverse direction compared with the opening process 400, in a linear outward direction on the rails 150. As a result the movable wall of the rear bumper 306a, attached to the intermediate link 146 by the hinge 148 and the spring 149, may be pushed toward the bumper 102. The hinge 148 and its accompanied spring 149, may receive the linear movement of the intermediate link 146 and transmit the displacement in a way to force the moveable wall of the rear bumper 306a to be displaced toward the initial place on the bumper 102. The movements of the moveable wall of the rear bumper 306a are marked as 16c and 14d, in FIG. 16. After being placed on the rear bumper 102, the magnetic lock 115 which is, in one example implementation, embedded on the rear bumper 102 and the movable wall 306a, may be triggered by the control system 308 to take the locking operation, and the process of the closing may be finished. The control system 308 may control the sequence of this operation. The sensors 152 may inform the controller 302 of the full placement of the movable wall of the rear bumper 306a on the bumper 102 in order to make the next control decision.

FIGS. 18A and 18B show exemplary covering processes associated with the covering system 300. FIG. 18A shows the opening process 400 of the covering system 300 and FIG. 18B shows the closing process 500 of the covering system 300. The flowcharts show the sequence of the opening 400 process and closing process 500 of the cover 306d. In step 402, the covering system 300, a mode of operation may be determined. A user may set the operation process to an automatically triggered mode or a manually triggered mode. The sequence of the manually triggered mode is shown by arrow 401 and the sequence of the automatically triggered mode is shown by arrow 403. In the manually triggered mode, a user may decide whether there is a need for the covering system 300 to be activated. In one exemplary implementation, upon deciding that a cover is needed, a user may use the remote control 302 to activate the following procedures. In step 409, of the automatically triggered mode of the opening process 400, the sensor system 304 through the inside sensing system 304a may determine the need for the opening process 400 of the covering system 300 which is activated when certain environmental conditions are detected including sunlight, temperature, and humidity. Referring to FIGS. 1 and 2, in one example implementation, the outside sensing system 304a may include the light sensor 120, the temperature sensor 111, and the humidity sensor 113, respectively configured to sense the sunlight, temperature and humidity. The controller 302 may decide the necessity of activation of the covering system 300. The opening process 400, then, undergoes the same sequence of actuations as the manually triggered mode.

In step 404, the distance of the vehicle 100 from adjacent walls or barriers of parking location may be determined. The distance may be checked to determine whether it is bigger than a predefined value, the value representing a distance needed for proper operation of an exemplary covering system. The distance may be sensed by the distance sensor 122. Referring to FIG. 1, in one example implementation, the distance sensor 122 may be placed on the rear bumper 102 in order to detect the distance of the rear bumper 102 to the barriers. Then the information may be sent to the controller 302. The controller 302 may determine if the distance meets the minimum defined threshold value. The minimum distance is the distance required for the folded cover and arms 306b to be taken out of the enclosure 106 and opened without collision. If the distance requirement is satisfied, the exemplary process may proceed to step 406. In the step 406 the first displacing mechanism 303a may be activated to displace the movable wall of the rear bumper 306a. In one example implementation the first position may be on the rear bumper 102 and the second position may be under the bottom surface of the vehicle 128. The displacing of the movable wall of the rear bumper 306a may be performed after the opening of a locking mechanism 115 embedded on the movable wall of the rear bumper 306a, which may be done by the control system 308, in one exemplary implementation of the present disclosure. The displacement of the movable wall of the rear bumper 306a may be from the first position to the second position in the opening process 400 shown in FIG. 4A, and from the second position to the first position in the closing process 500 of the covering system 300 shown in FIG. 4A.

Moving on to the next step 408, the controller 302 may activate the second displacing mechanism 303b in order to take the folded cover and arms 306b out of the first position to the second position. The first position may be inside the enclosure 106 and the second position may be parallel to the rear bumper 102 and the ground in one example implementation. In the folding process of the covering system 300 the folded cover and arms 306b may be taken inside the first position from the second position by the second displacing mechanism 303b. The controller 302 may decide the timing of the displacement of the folded cover and arms 306b. The opening/closing mechanism 303c may be also taken in or out of the enclosure 106 along with the folded cover and arms 306b. As a result the folded cover and arms 306b may be placed in the defined position ready to undergo the opening process 400 or the closing process 500 of the closed arms 134a and 134b. Moving to the next step 410 the opening/closing mechanism 303c may be activated by the controller 302. The opening/closing mechanism 303c may cause the arms 134a and 134b to move from the closed position to the opened position by a rotational movement or a set of three successive rotational movements in two different example implementations of the current disclosure for two different types of the vehicles 100, which is further described formerly in this disclosure. The closed position of the arms 134a and 134b may be the same as the second position of the previous step 408 and the opened position may be at either sides of the vehicle 100 parallel to the sides of the vehicle 100 and the ground. As a result the arms 134a and 134b may be placed in the positions which allows the unfolding process of the covering system 300 to be performed.

In step 412, the folding mechanism 303d may be activated by the control system 308 in order to unfold the cover 306d from the opened position of the step 410, i.e., the position in which the arms 134A and 134B may be parallel to either sides of the vehicle 100 and the ground, to a final position or fold the cover 306d from the final position to the opened position of the previous step 410. The unfolding process may be performed in the opening process 400 of the covering system 300 and the folding process may be performed in the closing process 500 of the covering system 300.

Referring to FIG. 18B, the closing process 500 of the covering system 300 may be carried out sequentially. The closing process 500 of the covering system 300 may be triggered by a user using the remote control 301. The steps of the closing process 500 are similar to the opening process 400 but performed in a reverse order, which is described in further detail throughout the present disclosure. The closing process 500 may begin by a user pressing a respective tab on the remote control 301, which is shown as step 502. After sending the uncovering command to the controller 302, the folding mechanism 303d may be activated by the controller 302 in the step 504. The folding mechanism 303d may actuate the cover 306d to take the folding operation from the unfolded position to the folded position on the opened arms 134a and 134b. As a result the cover 306d may be placed on the arms 134a and 134b in a folded state of the cover 306d wherein the arms 134a and 134b may be parallel to the sides of the vehicle 100 and the ground. In step 506, the opening/closing mechanism 303c may be activated by the controller 302 to actuate the arms 134a and 134b to be closed. The arms 134a and 134b may undergo the closing operation from the opened position to the closed positions of the arms 134a and 134b in either a pivotally rotational movement or a set of three pivotally rotational movements in the reverse direction compared with the opening process 400. As a result the arms 134a and 134b may be placed parallel to the rear bumper 102 and the ground, which is further described formerly in this disclosure. Moving on to the next step 508, the second displacing mechanism 303b, may be activated by the controller 302 to take the folded cover and arms 306b inside the enclosure 106. Moving on to the next step 510, the first displacing mechanism 303a may be activated by the controller 302 to displace the wall of the rear bumper 306a from the second position to the first position on the rear bumper 102.

What is claimed is:

1. A vehicle covering system, comprising:
    a cover, the cover comprising:
    a cover fabric comprising a plurality of folds in an accordion-pleated shape, an upper surface, and a lower surface;
    a plurality of transversal cords attached to the lower surface of the cover fabric providing a guiding passage for a strip-like member to pass on the lower surface of the cover fabric; and
    at least two longitudinal cords, wherein the longitudinal cords are symmetrically attached to the lower surface of the cover fabric at either sides of the strip-like member;
    a first arm and a second arm, a first portion of a first fold of the plurality of folds attached to an upper surface of the first arm and a second portion of the first fold attached to an upper surface of the second arm,
    an arms mechanism, configured to place the first and the second arms in respective opened and closed states, the respective opened and closed states being perpendicular to each other;
    a folding mechanism, configured to fold and unfold the cover across a length of a vehicle;
    a control system, configured to actuate the arm mechanism to open the first arm and the second arm from a closed state to an opened state and cause the arm mechanism to close the first arm and the second arm from the opened state to a closed state, and actuate the folding mechanism to fold and unfold the cover when the first and the second arms are in respective opened states; and
    an enclosure inside the rear section of the vehicle to enclose the cover, the first and the second arms, and the arm mechanism, wherein the rear section includes a part of the trunk and the hollow space inside a rear bumper.

2. The covering system according to claim 1, wherein the rear bumper includes a movable wall configured to be displaced from a first position to a second position, wherein the first location is on the rear bumper and the second location is under the vehicle.

3. The covering system according to claim 1, further comprising a first displacing mechanism configured to move a movable wall of the rear bumper from a first position to a second position, wherein the first displacing mechanism comprises:
    a rotary actuator with an output shaft;
    a converting mechanism coupled with the output shaft; and
    an intermediate link attached to the movable wall of the rear bumper from one side and engaged with the converting mechanism from the other side,
    wherein the converting mechanism is configured to convert the rotational movement of the output shaft to a linear movement of the intermediate link.

4. The covering system according to claim 1, further comprising a second displacing mechanism disposed within the enclosure, configured to displace the cover in a folded state, the arms and the arm mechanism, wherein the second displacing mechanism comprises:
    a movable mounting plate, configured to allow for mounting the arm mechanism thereon; and
    an actuating mechanism coupled with the movable mounting plate, configured to displace the movable mounting plate in and out of the enclosure.

5. The covering system according to claim 4, wherein the actuating mechanism comprises:
    a motor having an output shaft;
    a converting mechanism coupled with the output shaft; and
    wherein the converting mechanism is configured to convert the rotational movement of the output shaft to a linear movement of the movable mounting plate.

6. The covering system according to claim 1, wherein the arm mechanism includes:

a first actuating mechanism pivotally coupled to a proximal end of the first arm, configured to actuate the first arm to pivot about a first pivot point from a closed state to an opened state in an opening process and to pivot about the first pivot point from the opened state to the closed state in a closing process; and a second actuating mechanism pivotally coupled to a proximal end of the second arm, configured to actuate the second arm to pivot about a second pivot point from a closed state to an opened state in an opening process and to pivot about the second pivot point from the opened state to the closed state in a closing process.

7. The covering system according to claim 6, wherein the closed state is defined as a state of the arms parallel to the backside of the vehicle and ground.

8. The covering system according to claim 6, wherein the opened state is perpendicular to the ground.

9. The covering system according to claim 6, wherein the first actuating mechanism and the second actuating mechanism comprises:
 a hinge device having an upper leaf and a lower leaf and a central axis, wherein the lower leaf is fixed on the movable mounting plate, the upper leaf is attached to a respective arm,
 a motor coupled with the central axis, the motor configured to rotate the respective arm.

10. The covering system according to claim 9, wherein the first actuating mechanism and the second actuating mechanism comprises:
 a gearbox mechanism attached to the moveable mounting plate having an input shaft coupled with the motor and an output shaft pivotally attached to the proximal end of one of the arms, wherein the gearbox mechanism comprises:
 a housing, wherein the housing comprises a fixed cylindrical container mounted on the movable mounting plate and fixed thereon configured to linearly displace therewith, and a rotatable cylindrical housing mounted coaxially on the fixed cylindrical container;
 a bevel pinion-gear set, configured to rotate the respective arm, including a driver bevel gear mounted on the input shaft and coupled with the motor and meshed with a driven bevel pinion configured to transmit the rotational power of the motor to the driven bevel pinion and freely displace along a shaft and a driven bevel pinion mounted on the output shaft and attached pivotally to the proximal end of the respective arm, wherein the driven bevel pinion is configured to transmit the rotational power to the respective arm;
 a first flat gear coaxially attached to the upper surface of the driver bevel gear and rotatable therewith; and
 a solenoid attached to the upper section of the rotatable cylindrical container, wherein the solenoid is configured to engage and disengage the first flat gear with a second flat gear,
 wherein the second flat gear is attached to the solenoid coaxial with the first flat gear.

11. The covering system according to claim 1, wherein folding mechanism includes:
 a container;
 a strip-like member placed inside the container from one end and attached to a last fold of the plurality of folds; and
 an actuator, configured to roll the strip-like member in and out of the container.

12. The covering system according to claim 11, wherein the actuator includes:

a motor configured to drive the strip-like spring in and out of the container;
a roller wheel coupled with the motor transversely placed on the strip-like member forcing the strip-like member to move in a direct path;
a plurality of the rollers, placed on the strip-like member to straighten the path of the strip-like member.

13. The covering system according to claim 12, wherein the strip-like member of the folding mechanism is symmetrically attached to the last fold of the cover passing through the passage made by the transversal cords on the lower surface of the cover carrying the cover to be unfolded or folded.

14. The covering system according to claim 1, wherein two equal lengths of either sides of the first fold of the cover are attached to the upper surfaces of the first arm and the second arm.

15. The covering system according to claim 1, wherein the control system is configured to cause the second displacing mechanism to displace the arm mechanism, the first and the second arms, and the cover in and out of the enclosure when the first and the second arms are in the closed position.

16. A method for managing a covering system, wherein the method for opening comprises:
 sensing the environmental conditions for the covering system utilizing environmental data received from sensors;
 determining a need for activation of the covering system by a controller based on the environmental conditions;
 checking distance of a vehicle to barriers of a parking location responsive to a determination that activation of the covering system is needed;
 activating a first displacing mechanism for displacing a movable wall of a rear bumper from an initial location on a rear bumper to a secondary location;
 activating a second displacing mechanism for taking a folded cover and arms along with an arm mechanism out of a first enclosure to a second position parallel to the rear bumper and ground;
 activating the arm mechanism for opening closed arms from a closed state of the second position to an opened state of a third position; and
 activating a folding mechanism for unfolding a cover from a folded state in the third position to an unfolded state in a fourth position.

17. The method according to claim 16, wherein the positions include:
 the second position, wherein a folded cover and arms is placed parallel to the rear bumper and the ground;
 the third position, wherein the arms are opened and placed perpendicular to the ground; and
 the fourth position, wherein the cover is unfolded.

18. The method according to claim 17, wherein the method for closing includes:
 receiving an uncovering command by the controller from a remote control;
 activating the folding mechanism for folding the cover from an unfolded state of the fourth position to a folded state in the third position;
 activating the arm mechanism for closing the arms from the opened state in the third position to the closed state in the second position;
 activating the second displacing mechanism for taking the folded cover and arms along with the arm mechanism inside the first enclosure from the second position; and activating the first displacing mechanism for displacing the movable wall of the rear bumper to the initial location on the rear bumper.

19. The covering system according to claim 1, wherein the length of the car extends from the rear bumper to a front bumper.

* * * * *